(12) United States Patent
Ueda

(10) Patent No.: US 8,607,648 B2
(45) Date of Patent: Dec. 17, 2013

(54) ROTATION ANGLE DETECTION DEVICE AND TORQUE DETECTION DEVICE

(75) Inventor: Takeshi Ueda, Kashiba (JP)

(73) Assignee: JTEKT Corporation, Osaka-Shi (JP)

( * ) Notice: Subject to any disclaimer, the term of this patent is extended or adjusted under 35 U.S.C. 154(b) by 147 days.

(21) Appl. No.: 13/407,935

(22) Filed: Feb. 29, 2012

(65) Prior Publication Data

US 2012/0227514 A1   Sep. 13, 2012

(30) Foreign Application Priority Data

Mar. 9, 2011   (JP) .................................. 2011-051638

(51) Int. Cl.
*G01L 3/02* (2006.01)

(52) U.S. Cl.
USPC ................................ 73/862.325; 73/862.333

(58) Field of Classification Search
USPC ....................................... 73/862.331–862.335
See application file for complete search history.

(56) References Cited

U.S. PATENT DOCUMENTS

| | | | | |
|---|---|---|---|---|
| 5,889,400 | A   * | 3/1999 | Nakazawa | ................. 324/207.2 |
| 6,677,724 | B1 * | 1/2004 | Kim et al. | ..................... 318/700 |
| 6,858,956 | B2 * | 2/2005 | Nakajima | .................. 310/68 B |
| 2002/0124663 | A1 * | 9/2002 | Tokumoto et al. | ........ 73/862.333 |
| 2011/0025238 | A1 * | 2/2011 | Ueda et al. | ............... 318/400.02 |

FOREIGN PATENT DOCUMENTS

JP    A-06-109750    4/1994

* cited by examiner

*Primary Examiner* — Max Noori
(74) *Attorney, Agent, or Firm* — Oliff & Berridge, PLC

(57) ABSTRACT

A rotor includes a cylindrical magnet having a plurality of magnetic pole pairs. There are two types of the magnitude of magnetic force in the magnetic pole pairs, that is, a relatively large first magnetic force and a second magnetic force that is smaller than the first magnetic force. Three magnetic sensors are arranged around the rotor. A rotation angle computing device detects the peak values of output signals of the respective magnetic sensors. Then, the rotation angle computing device identifies the magnetic pole pair, sensed by the first magnetic sensor, based on a combination of the local maximum values of the three output signals.

8 Claims, 12 Drawing Sheets

FIG. 4

| POLE NUMBER | PEAK VALUE OF V1 | PEAK VALUE OF V2 | PEAK VALUE OF V3 |
|---|---|---|---|
| 1 | P1(1) | P2(1) | P3(1) |
| 2 | P1(2) | P2(2) | P3(2) |
| 3 | P1(3) | P2(3) | P3(3) |
| ⋮ | ⋮ | ⋮ | ⋮ |
| 15 | P1(15) | P2(15) | P3(15) |
| 16 | P1(16) | P2(16) | P3(16) |

F I G . 8
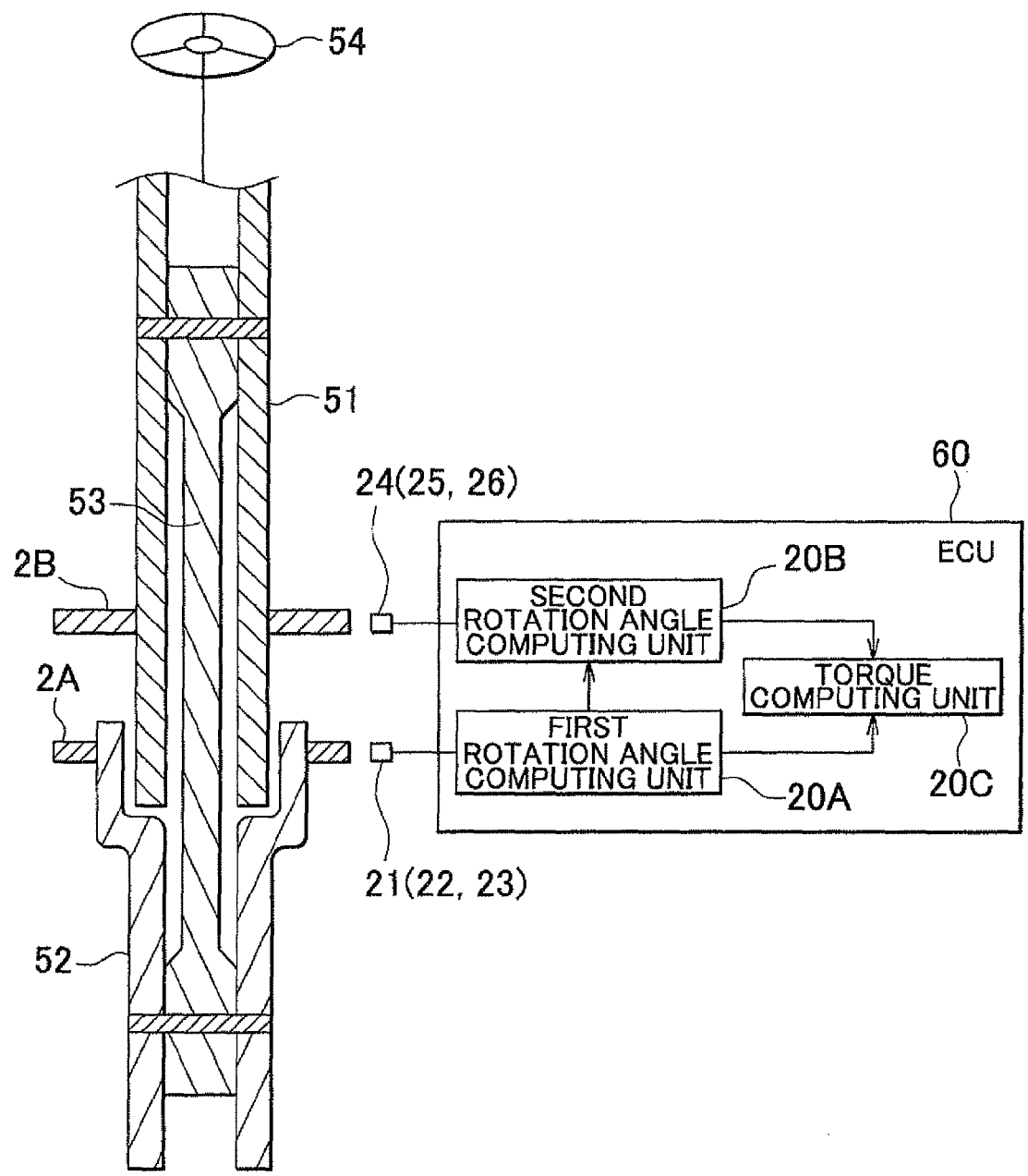

US 8,607,648 B2

ROTATION ANGLE DETECTION DEVICE AND TORQUE DETECTION DEVICE

INCORPORATION BY REFERENCE

The disclosure of Japanese Patent Applications No. 2011-051638 filed on Mar. 9, 2011 including the specification, drawings and abstract, is incorporated herein by reference in its entirety.

BACKGROUND OF THE INVENTION

1. Field of the Invention

The invention relates to a rotation angle detection device that detects the rotation angle of a rotor, such as a rotor of a brushless motor, and a torque detection device.

2. Description of Related Art

In order to control a brushless motor used in an electric power steering system, or the like, currents need to be conducted through stator coils in accordance with the rotation angle of a rotor. Then, there is known a rotation angle detection device that detects the rotation angle of a rotor of a brushless motor using a detection rotor that rotates with rotation of the brushless motor. Specifically, as shown in FIG. 13, a detection rotor 101 (hereinafter, referred to as "rotor 101") includes a cylindrical magnet 102 having a plurality of magnetic pole pairs that correspond to magnetic pole pairs of a rotor of a brushless motor. Two magnetic sensors 121 and 122 are arranged around the rotor 101 at a predetermined angular interval about the rotation axis of the rotor 101. The magnetic sensors 121 and 122 output sinusoidal signals having a predetermined phase difference. The rotation angle of the rotor 101 (the rotation angle of the rotor of the brushless motor) is detected based on these two sinusoidal signals (see, for example, Japanese Patent Application Publication No. 6-109750 (JP 6-109750 A)).

In this example, the magnet 102 has five magnetic pole pairs. That is, the magnet 102 has ten magnetic poles that are arranged at equiangular intervals. The magnetic poles are arranged at angular intervals of 36° (180° in electric angle) about the rotation axis of the rotor 101. In addition, the two magnetic sensors 121 and 122 are arranged at an angular interval of 18° (90° in electric angle) about the rotation axis of the rotor 101.

The direction indicated by the arrow in FIG. 13 is defined as the forward rotation direction of the detection rotor 101. Then, as the rotor 101 is rotated in the forward direction, the rotation angle of the rotor 101 increases, whereas, as the rotor 101 is rotated in the reverse direction, the rotation angle of the rotor 101 reduces. As shown in FIG. 14, the magnetic sensors 121 and 122 respectively output sinusoidal signals V1 and V2. During one period of each of the sinusoidal signals V1 and V2, the rotor 101 rotates an angle (72° (360° in electric angle)) corresponding to a single magnetic pole pair.

The angular range of one rotation of the rotor 101 is divided into five sections corresponding to the five magnetic pole pairs. The angle of the rotor 101, which is expressed on the condition that the start position of each section is 0° and the end position of each section is 360°, is termed the electric angle θe of the rotor 101. Here, the first magnetic sensor 121 outputs the output signal V1 (=A1·sin θe) and the second magnetic sensor 122 outputs the output signal V2 (=A2·cos θe). A1 and A2 are amplitudes. If the amplitudes A1 and A2 of the respective output signals V1 and V2 are equal to each other, the electric angle θe of the rotor 101 may be obtained using both output signals V1 and V2 according to Equation 1 below.

$$\theta e = \tan^{-1}(\sin \theta e / \cos \theta e)$$
$$\tan^{-1}(V1/V2) \qquad \text{Equation 1}$$

The thus obtained electric angle θe is used to control the brushless motor.

In the above-described conventional rotation angle detection device, because the amplitudes of the output signals V1 and V2 of the respective magnetic sensors 121 and 122 fluctuate from one magnetic pole to another due to, for example, variations in magnetic force among magnetic poles, an error may occur in detecting the rotation angle of the rotor 101. Therefore, the output signals V1 and V2 of the respective magnetic sensors 121 and 122 are corrected (the amplitudes are corrected) such that the amplitudes of the output signals V1 and V2 of the respective magnetic sensors 121 and 122 are equal to each other based on the mechanical angle of the rotor 101, and then the electric angle θe of the rotor 101 is computed.

When magnetic force varies among the magnetic poles, amplitude correction values used to correct the amplitudes of the output signals V1 and V2 of the respective magnetic sensors 121 and 122 by one period or half a period in the electric angle need to be changed. Therefore, to perform such amplitude correction, it is necessary to identify the magnetic poles sensed by the magnetic sensors 121 and 122. After the rotor 101 rotates 360° in mechanical angle, it is possible to identify the magnetic poles sensed by the magnetic sensors 121 and 122 based on the differences in peak value among the magnetic poles. Therefore, it is possible to perform amplitude correction based on the magnetic poles sensed by the magnetic sensors 121 and 122. However, immediately after start-up of the brushless motor, it is not possible to identify the magnetic poles sensed by the magnetic sensors 121 and 122. Therefore, it is not possible to perform amplitude correction based on the magnetic poles sensed by the magnetic sensors 121 and 122.

Note that a torque detection device used in an electric power steering system, or the like, detects the torsional angle of a torsion bar spring that couples an input shaft to an output shaft to thereby compute a torque applied to the input shaft. The torsional angle of the torsion bar spring becomes a value corresponding to the difference between the rotation angle of the input shaft and the rotation angle of the output shaft. Then, the rotation angle of the input shaft and the rotation angle of the output shaft are detected in a similar manner to that of the conventional rotation angle detection device, and then a torque applied to the input shaft is computed based on the difference between the detected rotation angle of the input shaft and the detected rotation angle of the output shaft.

SUMMARY OF THE INVENTION

It is an object of the invention to provide a rotation angle detection device that is able to identify magnetic poles respectively sensed by magnetic sensors in an early stage immediately after a rotor starts rotation, and a torque detection device.

An aspect of the invention relates to a rotation angle detection device that detects a rotation angle of a rotor. The rotation angle detection device includes: a multi-polar magnet that rotates with rotation of the rotor, and that has at least one magnetic pole pair having a first magnetic force and at least one magnetic pole pair having a second magnetic force; a plurality of magnetic sensors that respectively output sinusoidal output signals having a phase difference with rotation of the multi-polar magnet; a peak value detecting unit that detects peak values of output signals of the respective magnetic sensors; and a magnetic pole pair identifying unit that identifies one of the magnetic pole pairs, sensed by one of the magnetic sensors, which serves as a reference magnetic sensor, based on a combination of the peak values of the output signals of the respective magnetic sensors, detected by the peak value detecting unit. The number of the magnetic pole pairs, the number of the magnetic sensors, an arrangement pattern of the at least one magnetic pole pair having the first magnetic force and the at least one magnetic pole pair having the second magnetic force and arrangement positions of the magnetic sensors are set such that the combination of the peak values of the output signals of the respective magnetic sensors differs among the magnetic pole pairs sensed by the reference magnetic sensor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein;

FIG. 4 is a chart that shows the details of a peak value table;

FIG. 8 is a schematic view that shows the configuration of a second embodiment in the case where the invention is applied to a torque detection device of a vehicle steering system;

DETAILED DESCRIPTION OF EMBODIMENTS

Figure 1:
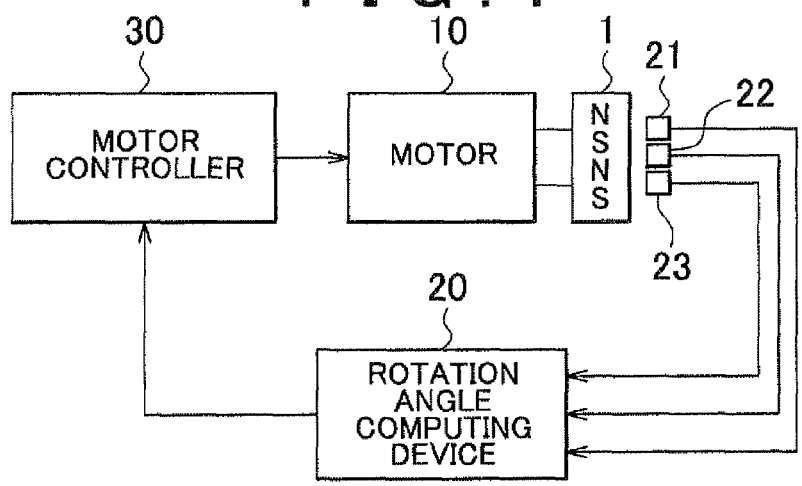
FIG. 1 is a schematic view that shows the configuration of a first embodiment in the case where the invention is applied to a rotation angle detection device that detects the rotation angle of a rotor of a brushless motor.
Figure 2:
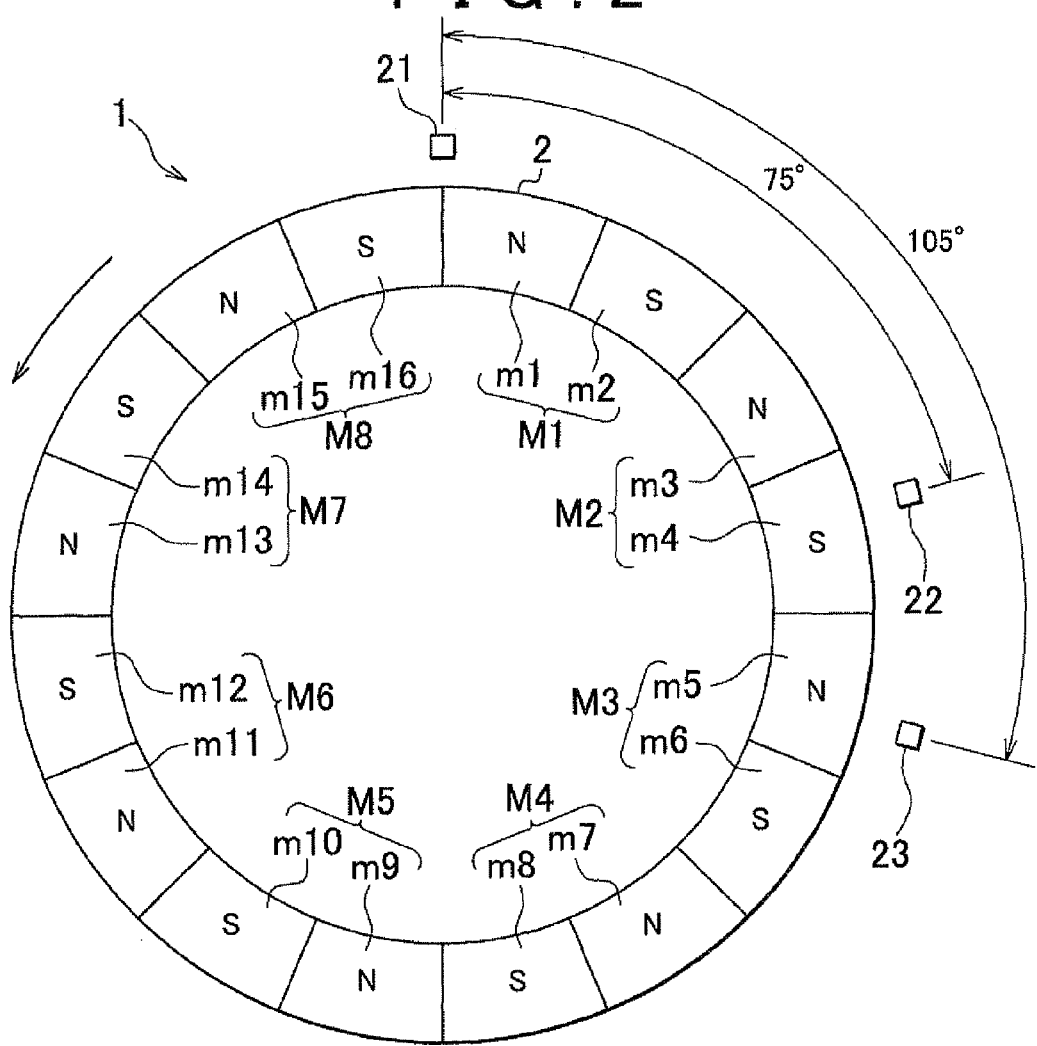
FIG. 2 is a schematic view that shows the configuration of a detection rotor.

Hereinafter, embodiments of the invention will be described in detail with reference to the accompanying drawings. FIG. 1 is a schematic view that shows the configuration of a first embodiment in the case where the invention is applied to a rotation angle detection device that detects the rotation angle of a rotor of a brushless motor. The rotation angle detection device includes a detection rotor (hereinafter, simply referred to as "rotor 1") that rotates with rotation of the brushless motor 10. As shown in FIG. 2, the rotor 1 includes a cylindrical magnet (multi-polar magnet) 2 having a plurality of magnetic pole pairs that correspond to magnetic pole pairs of the rotor of the brushless motor 10.

The magnet 2 has eight magnetic pole pairs M1 to M8. That is, the magnet 2 has sixteen magnetic poles m1 to m16 that are arranged at equiangular intervals. The magnetic poles m1 to m16 are arranged at angular intervals of 22.5° (180° in electric angle) about the rotation axis of the rotor 1. In this embodiment, there are two types of the magnitude of magnetic force in the magnetic pole pairs, that is, a relatively large first magnetic force and a second magnetic force that is smaller than the first magnetic force. In this embodiment, among the eight magnetic pole pairs M1 to M8, the magnetic forces of the first, second, third and fifth magnetic pole pairs M1, M2, M3 and M5 are set at the second magnetic force (weak magnetic force), and the magnetic forces of the fourth, sixth, seventh and eighth magnetic pole pairs M4, M6, M7 and M8 are set at the first magnetic force (strong magnetic force).

Three magnetic sensors 21, 22 and 23 are arranged around the rotor 1. These three magnetic sensors 21, 22 and 23 may also be respectively referred to as the first magnetic sensor 21, the second magnetic sensor 22 and the third magnetic sensor 23. In FIG. 2, the second magnetic sensor 22 is arranged at a position spaced apart by 75° (600° in electric angle) from the first magnetic sensor 21 in the clockwise direction about the rotation axis of the rotor 1. The third magnetic sensor 23 is arranged at a position spaced apart by 105° (840° in electric angle) from the first magnetic sensor 21 in the clockwise direction about the rotation axis of the rotor 1.

In other words, the three magnetic sensors 21, 22 and 23 are arranged such that, when the first magnetic sensor 21 faces the position at 0° in electric angle in the first magnetic pole pair M1, the second magnetic sensor 22 faces the position at 240° in electric angle in the second magnetic pole pair M2 and the third magnetic sensor 23 faces the position at 120° in electric angle in the third magnetic pole pair M3. Each magnetic sensor may be, for example, a magnetic sensor that includes an element of which the electrical characteristic changes under the influence of a magnetic field, such as a Hall element and a magnetoresistive element (MR element).

Figure 3:
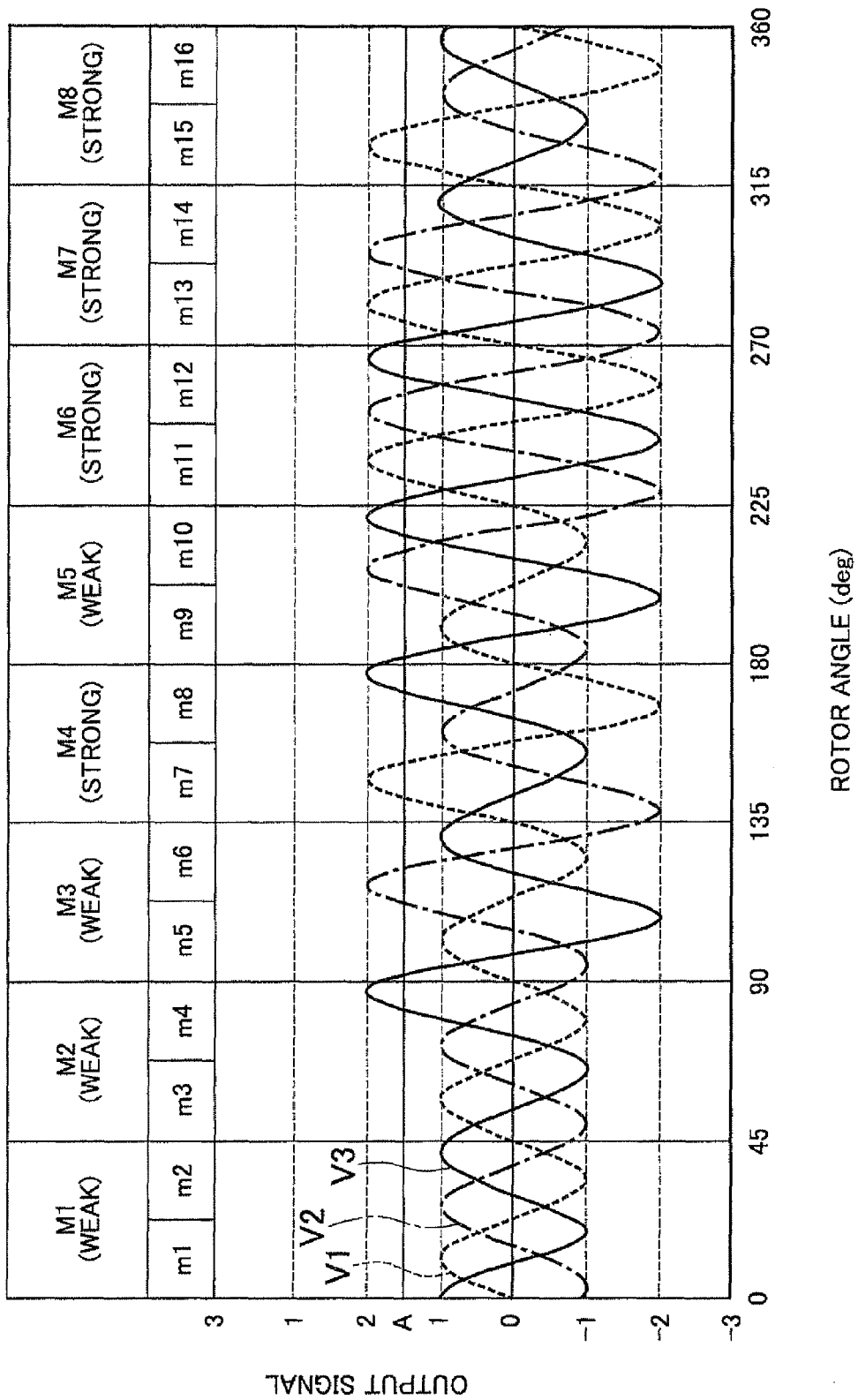
FIG. 3 is a schematic view that shows the output signal waveforms of first, second and third magnetic sensors and the magnetic pole sensed by the first magnetic sensor.

The direction indicated by the arrow in FIG. 2 is defined as the forward rotation direction of the rotor 1. Then, as the rotor 1 is rotated in the forward direction, the rotation angle of the rotor 1 increases; whereas, as the rotor 1 rotates in the reverse direction, the rotation angle of the rotor 1 reduces. As shown in FIG. 3, the magnetic sensors 21, 22 and 23 respectively output sinusoidal signals V1, V2 and V3. During one period of each of the sinusoidal signals V1, V2 and V3, the rotor 1 rotates an angle (45° (360° in electric angle)) corresponding to a single magnetic pole pair.

FIG. 3 shows the output signals V1, V2 and V3 of the respective magnetic sensors 21, 22 and 23 with respect to a rotor angle (mechanical angle) in the case where the rotation angle of the rotor 1 is set at 0° when the boundary between the magnetic pole pair M8 and magnetic pole pair M1 of the rotor 1 faces the first magnetic sensor 21. In addition, FIG. 3 shows the magnetic pole pair and magnetic pole, among the magnetic pole pairs M1 to M8 and magnetic poles m1 to m16, sensed by the first magnetic sensor 21 with respect to a rotor angle, and shows the magnitude of magnetic force of each of the magnetic pole pairs M1 to M8.

The angular range of one rotation of the rotor 1 is divided into eight sections corresponding to the eight magnetic pole pairs M1 to M8, and then the angle of the rotor 1, which is expressed on the condition that the start position of each section is 0° and the end position of each section is 360°, is termed the electric angle θe of the rotor 1. Here, the first magnetic sensor 21 outputs the output signal V1 (=A1·sin θe) for each section corresponding to one of the eight magnetic pole pairs M1 to M8. In this case, the second magnetic sensor 22 outputs the output signal V2 (=A2·sin(θe+600°))=A2·sin (θe+240°)) for each section corresponding to one of the eight magnetic pole pairs M1 to M8. In addition, the third magnetic sensor 23 outputs the output signal V3 (=A3·sin(θe+840°)= A3·sin(θe+120°)) for each section corresponding to one of the eight magnetic pole pairs M1 to M8. A1, A2 and A3 respectively indicate amplitudes. Note that, the amplitudes A1, A2 and A3 change according to the magnitude of magnetic force of each of the magnetic pole pairs M1 to M8.

Thus, the magnetic sensors 21, 22 and 23 respectively output sinusoidal signals having a predetermined phase difference 120° (electric angle). The output signals V1, V2 and V3 of the respective magnetic sensors 21, 22 and 23 may be termed the first output signal V1, the second output signal V2 and the third output signal V3. Referring back to FIG. 1, the output signals V1, V2 and V3 of the respective magnetic sensors 21, 22 and 23 are input into a rotation angle computing device 20. The rotation angle computing device 20 identifies the magnetic poles sensed by the magnetic sensors 21, 22 and 23 based on the output signals V1, V2 and V3 of the respective magnetic sensors 21, 22 and 23. The rotation angle computing device 20 corrects the amplitudes of the output signals V1, V2 and V3 of the respective magnetic sensors 21, 22 and 23 based on the identified magnetic poles sensed by the magnetic sensors 21, 22 and 23. Then, the rotation angle computing device 20 computes the electric angle θe and mechanical angle θm of the rotor 1 based on the output signals of which the amplitudes have been corrected.

The electric angle θe and mechanical angle θm computed by the rotation angle computing device 20 are given to a motor controller 30. The motor controller 30 uses the electric angle θe and mechanical angle θm given from the rotation angle computing device 20 to control the brushless motor 10. The rotation angle computing device 20 is, for example, formed of a microcomputer, and includes a central processing unit (CPU) and memories (a ROM, a RAM, a rewritable nonvolatile memory, or the like). The nonvolatile memory of the rotation angle computing device 20 stores a peak value table for each of the magnetic sensors 21, 22 and 23.

FIG. 4 is a schematic view that shows the details of the peak value table. The peak value table stores, for each of the magnetic pole numbers 1 to 16 of the respective magnetic poles m1 to m16, the peak values (local maximum values or local minimum values) P1(1) to P1(16) of the output signal V1 of the first magnetic sensor 21, corresponding to the respective magnetic poles, the peak values (local maximum values or local minimum values) P2(1) to P2(16) of the output signal V2 of the second magnetic sensor 22, corresponding to the respective magnetic poles, and the peak values (local maximum values or local minimum values) P3(1) to P3(16) of the output signal V3 of the third magnetic sensor 23, corresponding to the respective magnetic poles. Note that the magnetic sensors 21, 22 and 23 have substantially the same characteristics, so the peak values of the output signals of the magnetic sensors 21, 22 and 23 for the same magnetic poles are substantially the same.

Figure 5:
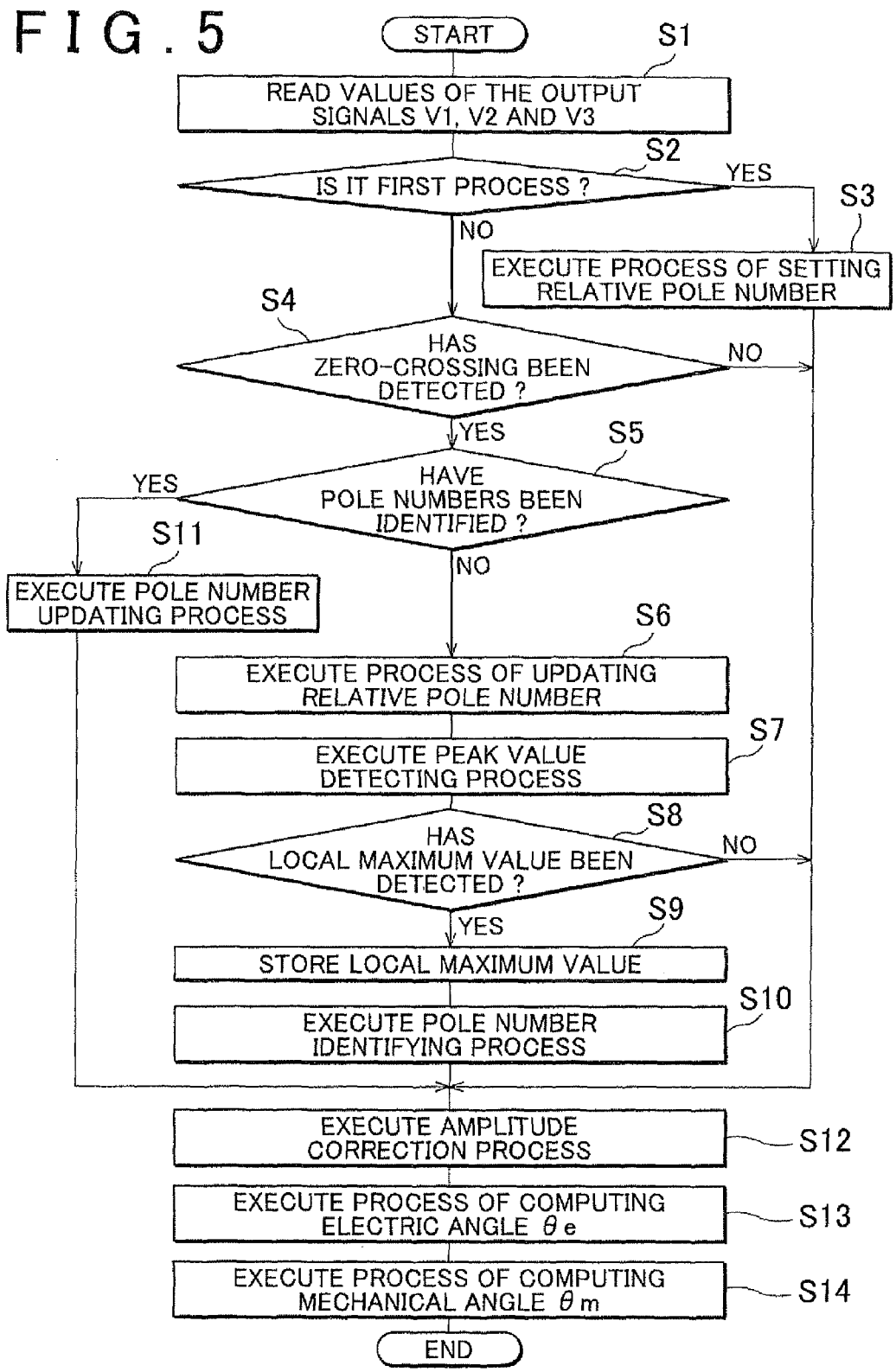
FIG. 5 is a flowchart that shows the procedure of the rotation angle computing process executed by a rotation angle computing device.

The peak values are stored in the peak value table, for example, before shipment of the brushless motor 10. The peak values stored in the amplitude correction peak value table may be obtained from one-period data or may be obtained from the mean values of multi-period data. FIG. 5 is a flowchart that shows the procedure of rotation angle computing process executed by the rotation angle computing device 20.

The rotation angle computing process shown in FIG. 5 is repeatedly executed at predetermined computation intervals. A relative number, allocated to each magnetic pole using the magnetic pole sensed by the first magnetic sensor 21 at the time of the start of rotation angle computing process as a reference magnetic pole, is defined as a relative pole number. The relative pole number of the magnetic pole sensed by the first magnetic sensor 21 (hereinafter, referred to as "first relative pole number") is denoted by a variable r1, the relative pole number of the magnetic pole sensed by the second magnetic sensor 22 (hereinafter, referred to as "second relative pole number") is denoted by a variable r2, and the relative pole number of the magnetic pole sensed by the third magnetic sensor 23 (hereinafter, referred to as "third relative pole number") is denoted by a variable r3. Note that each of the relative pole numbers r1, r2 and r3 is an integer of from 1 to 16 the relative pole number smaller by one than 1 is 16, and the relative pole number larger by one than 16 is 1.

In this embodiment, when the magnetic pole sensed by the first magnetic sensor 21 at the time of the start of rotation angle computing process (reference magnetic pole) is a north pole, the relative pole number "1" is allocated to that magnetic pole. On the other hand, when the magnetic pole sensed by the first magnetic sensor 21 at the time of the start of rotation angle computing process (reference magnetic pole) is a south pole, the relative pole number "2" is allocated to that magnetic pole.

In addition, the pole number of the magnetic pole sensed by the first magnetic sensor 21 is denoted by q1, the pole number of the magnetic pole sensed by the second magnetic sensor 22 is denoted by q2, and the pole number of the magnetic pole sensed by the third magnetic sensor 23 is denoted by q3. Note that each of the pole numbers q1, q2 and q3 is an integer of from 1 to 16, the pole number smaller by one than 1 is 16, and the pole number larger by one than 16 is 1. In addition, the magnetic pole pair number of the magnetic pole pair sensed by the first magnetic sensor 21 is denoted by Q1. Note that the magnetic pole pair number Q1 is an integer of from 1 to 8, the pole number smaller by one than 1 is 8, and the pole number larger by one than 8 is 1.

When the rotation angle computing process is started, the rotation angle computing device 20 reads the values of the output signals V1, V2 and V3 of the respective magnetic sensors 21, 22 and 23 (step S1). Note that the memory (for example, RAM) of the rotation angle computing device 20 stores the output signal values that have been read so far since the computation cycle that is multiple cycles before to the current computation cycle.

In addition, in this embodiment, in order to detect the peak value (local maximum value or local minimum value) of the output signal V1, the output signal value of which the absolute value is larger among the read values of the output signal V1 is saved in the memory as the peak value candidate of output signal V1. Similarly, in order to detect the peak value (local maximum value or local minimum value) of the output signal V2, the output signal value of which the absolute value is larger among the read values of the output signal V2 is saved in the memory as the peak value candidate of the output signal V2. Similarly, in order to detect the peak value (local maximum value or local minimum value) of the output value V3, the output signal value of which the absolute value is larger among the read values of the output signal V3 is saved in the memory as the peak value candidate of the output signal V3. Note that, when the zero-crossing of one of the output signals has been detected, the corresponding peak value candidate is reset to zero at a predetermined timing as will be described later.

As the values of the output signals V1, V2 and V3 are read in step S1, the rotation angle computing device 20 determines whether the current process is the first process after the start of rotation angle computing process (step S2). When the current process is the first process after the start of rotation angle computing process (YES in step S2), the rotation angle computing device 20 executes the process of setting a relative pole number (step S3).

Figure 6:
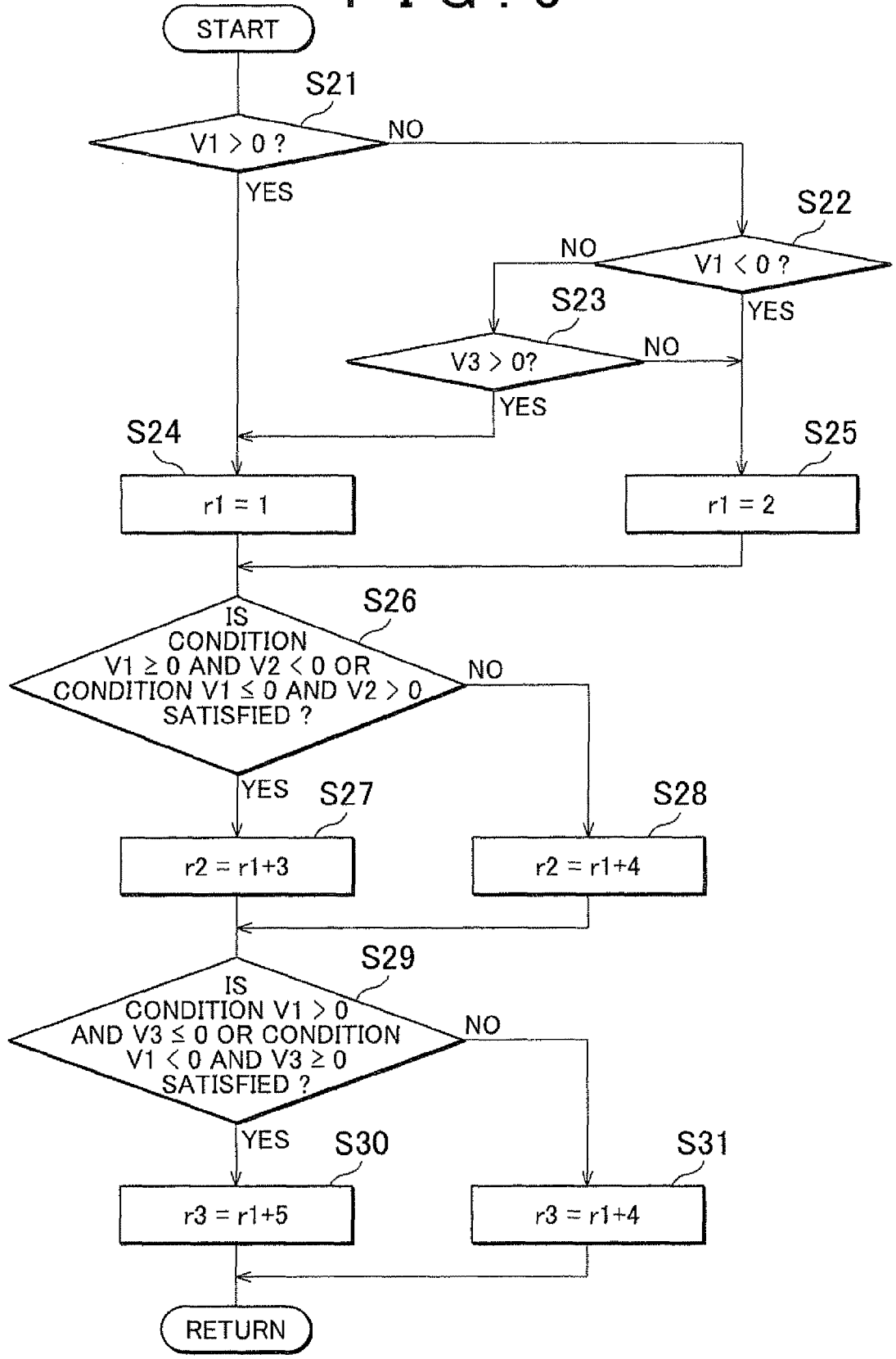
FIG. 6 is a flowchart that shows the procedure of the process of setting a relative pole number in step S3 of FIG. 5.

FIG. 6 shows the detailed procedure of the process of setting a relative pole number. The rotation angle computing device 20 initially determines whether the value of the first output signal V1 is larger than 0 (step S21). When the value of the first output signal V1 is larger than 0 (YES in step S21), the rotation angle computing device 20 determines that the magnetic pole sensed by the first magnetic sensor 21 (reference magnetic pole) is a north pole, and then sets the first relative pole number r1 at 1 (step S24). Then, the process proceeds to step S26.

On the other hand, when the value of the first output signal V1 is smaller than or equal to 0 (NO in step S21), the rotation angle computing device 20 determines whether the value of the first output signal V1 is smaller than 0 (step S22). When the value of the first output signal V1 is smaller than 0 (YES in step S22), the rotation angle computing device 20 determines that the magnetic pole sensed by the first magnetic sensor 21 (reference magnetic pole) is a south pole, and then sets the first relative pole number r1 at 2 (step S25). Then, the process proceeds to step S26.

When it is determined in step S22 that the value of the first output signal V1 is larger than or equal to 0 (NO in step S22), that is, when the value of the first output signal V1 is 0, the rotation angle computing device 20 determines whether the value of the third output signal V3 is larger than 0 in order to determine whether the rotor rotation angle (electric angle) is 0° or 180° (step S23). When the value of the third output signal V3 is larger than 0 (YES in step S23), the rotation angle computing device 20 determines that the rotor rotation angle (electric angle) is 0°, and then sets the first relative pole number r1 at 1 (step S24). Then, the process proceeds to step S26.

On the other hand, when the value of the third output signal V3 is smaller than or equal to 0 (NO in step S23), the rotation angle computing device 20 determines that the rotor rotation angle (electric angle) is 180°, and then sets the first relative pole number r1 at 2 (step S25). Then, the process proceeds to step S26. Note that the rotation angle computing device 20 may determine in step S23 whether the value of the second output signal V2 is smaller than 0. In this case, when the value of the second output signal V2 is smaller than 0, the rotation angle computing device 20 causes the process to proceed to step S24 and then sets the first relative pole number r1 at 1. On the other hand, when the value of the second output signal V2 is larger than or equal to 0, the rotation angle computing device 20 causes the process to proceed to step S25 and then sets the first relative pole number r1 at 2.

In step S26, the rotation angle computing device 20 determines whether the condition "V1≥0 and V2<0" or the condition "V1≤0 and V2>0" is satisfied. When the above condition is satisfied (YES in step S26), the rotation angle computing device 20 determines that the pole number of the magnetic pole sensed by the second magnetic sensor 22 is larger by three than the pole number of the magnetic pole sensed by the first magnetic sensor 21, and sets the second relative pole number r2 at a number that is larger by three than the first relative pole number r1 (r2=r1+3) (step S27). Then, the process proceeds to step S29.

On the other hand, when the condition of step S26 is not satisfied (NO in step S26), the rotation angle computing device 20 determines that the pole number of the magnetic pole sensed by the second magnetic sensor 22 is larger by four than the pole number of the magnetic pole sensed by the first magnetic sensor 21, and then sets the second relative pole number r2 at a number that is larger by four than the first relative pole number r1 (r2=r1+4) (step S28). Then, the process proceeds to step S29.

In step S29, the rotation angle computing device 20 determines whether the condition "V1>0 and V3≤0" or the condition "V1<0 and V3≥0" is satisfied. When the above condition is satisfied (YES in step S29), the rotation angle computing device 20 determines that the pole number of the magnetic pole sensed by the third magnetic sensor 23 is larger by five than the pole number of the magnetic pole sensed by the first magnetic sensor 21, and then sets the third relative pole number r3 at a number that is larger by five than the first relative pole number r1 (r3=r1+5) (step S30). Then, the process returns to step S12 of FIG. 5.

On the other hand, the condition of step S29 is not satisfied (NO in step S29), the rotation angle computing device 20 determines that the pole number of the magnetic pole sensed by the third magnetic sensor 23 is larger by four than the pole number of the magnetic pole sensed by the first magnetic sensor 21, and then sets the third relative pole number r3 at a number that is larger by four than the first relative pole number r1 (r3=r1+4) (step S31). Then, the process returns to step S12 of FIG. 5.

The reason why the second relative pole number r2 is set at a number that is larger by three than the first relative pole number r1 (r2=r1+3) when the condition of step S26 is satisfied and the second relative pole number r2 is set at a number that is larger by four than the first relative pole number r1 (r2=r1+4) when the condition of step S26 is not satisfied will be described. In addition, the reason why the third relative pole number r3 is set at a number that is larger by five than the first relative pole number r1 (r3=r1+5) when the condition of step S29 is satisfied and the third relative pole number r3 is set at a number that is larger by four than the first relative pole number r1 (r3=r1+4) when the condition of S29 is not satisfied will be described.

Figure 7A:
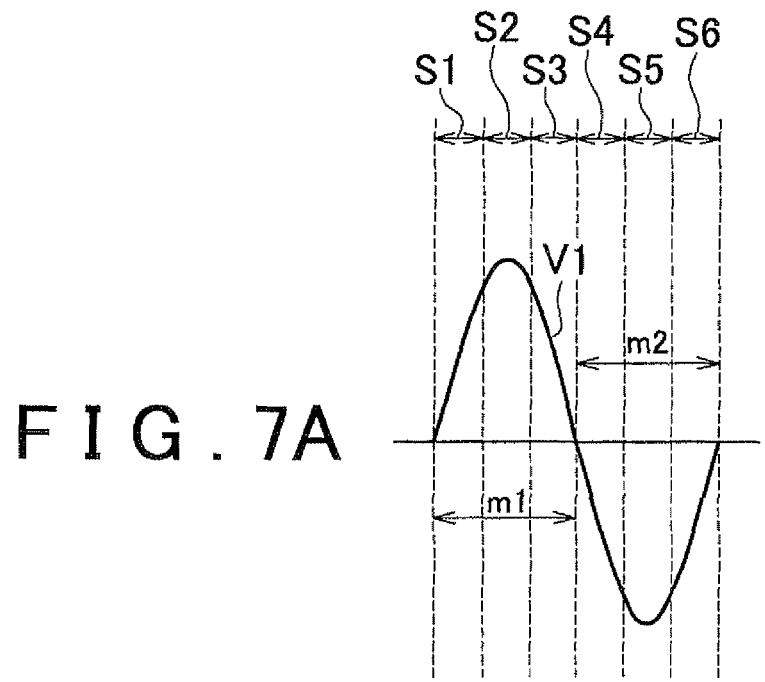
FIG. 7A to FIG. 7C are charts for illustrating the process of setting a relative pole number.
Figure 7B:
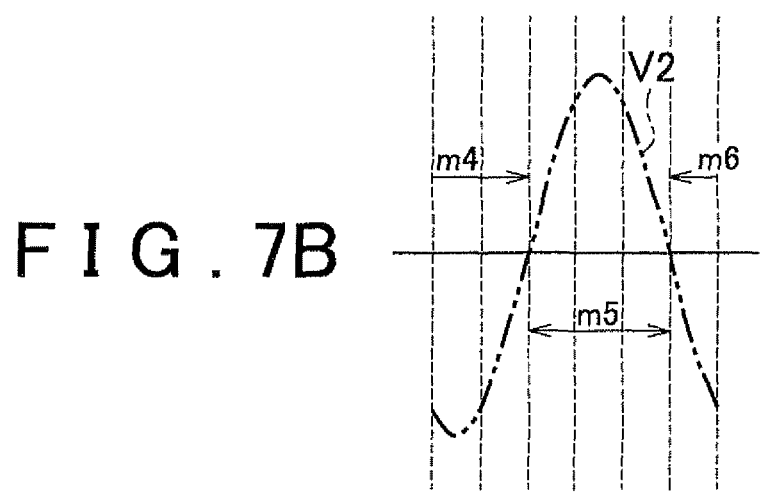
Figure 7C:
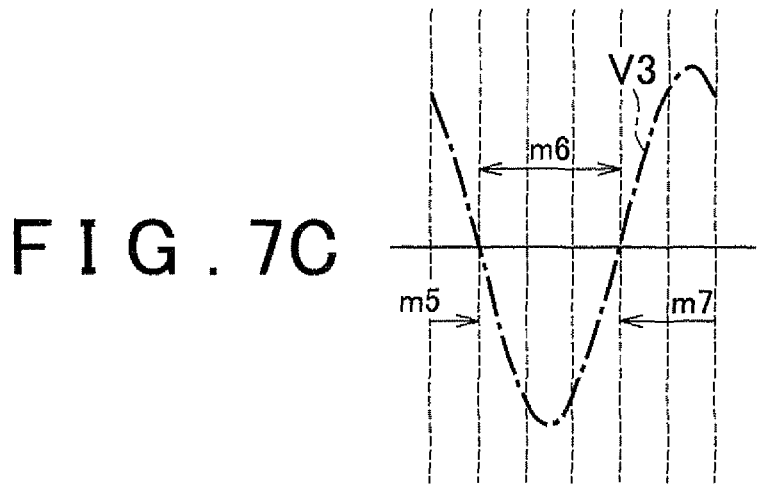

For example, FIG. 7A to FIG. 7C schematically show the signal waveforms of the output signals V1, V2 and V3 of the respective first, second and third magnetic sensors 21, 22 and 23 at the time when the magnetic pole pair M1 formed of the magnetic pole m1 and magnetic pole m2 of the rotor 1 passes the first magnetic sensor 21. In FIG. 7A and FIG. 7B, S1 and S2 indicate the regions in which the first magnetic sensor 21 senses the magnetic pole m1 and the second magnetic sensor 22 senses the magnetic pole m4. S3 indicates the region in which the first magnetic sensor 21 senses the magnetic pole m1 and the second magnetic sensor 22 senses the magnetic pole m5. S4 and S5 indicate the regions in which the first magnetic sensor 21 senses the magnetic pole m2 and the second magnetic sensor 22 senses the magnetic pole m5. S6 indicates the region in which the first magnetic sensor 21 senses the magnetic pole m2 and the second magnetic sensor 22 senses the magnetic pole m6.

That is, in the regions S1, S2, S4 and S5, the pole number of the magnetic pole sensed by the second magnetic sensor 22 is larger by three than the pole number of the magnetic pole sensed by the first magnetic sensor 21. On the other hand, in the regions S3 and S6, the pole number of the magnetic pole sensed by the second magnetic sensor 22 is larger by four than the pole number of the magnetic pole sensed by the first magnetic sensor 21. In the regions S1 and S2, the values of the output signals V1 and V2 satisfy the first condition that V1≥0 and V2<0. In the region S3, the values of the output signals V1 and V2 satisfy the second condition that V1>0 and V2≥0. In the regions S4 and S5, the values of the output signals V1 and V2 satisfy the third condition that V1≤0 and V2>0. In the region S6, the values of the output signals V1 and V2 satisfy the fourth condition that V1<0 and V2≤0.

Then, the rotation angle computing device 20 determines that the pole number of the magnetic pole sensed by the second magnetic sensor 22 is larger by three than the pole number of the magnetic pole sensed by the first magnetic sensor 21 when the first condition (V1≥0 and V2<0) or the third condition (V1≤0 and V2>0) is satisfied, and determines that the pole number of the magnetic pole sensed by the second magnetic sensor 22 is larger by four than the pole number of the magnetic pole sensed by the first magnetic sensor 21 when neither the first condition nor the third condition is satisfied.

In addition, in FIG. 7A and FIG. 7C, S1 indicates the region in which the first magnetic sensor 21 senses the magnetic pole m1 and the third magnetic sensor 23 senses the magnetic pole m5. S2 and S3 indicate the regions in which the first magnetic sensor 21 senses the magnetic pole m1 and the third magnetic sensor 23 senses the magnetic pole m6. S4 indicates the region in which the first magnetic sensor 21 senses the magnetic pole m2 and the third magnetic sensor 23 senses the magnetic pole m6. S5 and S6 indicate the regions in which the first magnetic sensor 21 senses the magnetic pole m2 and the third magnetic sensor 23 senses the magnetic pole m7.

That is, in the regions S1 and S4, the pole number of the magnetic pole sensed by the third magnetic sensor 23 is larger by four than the pole number of the magnetic pole sensed by the first magnetic sensor 21. On the other hand, in the regions S2, S3, S5 and S6, the pole number of the magnetic pole sensed by the second magnetic sensor 22 is larger by five than the pole number of the magnetic pole sensed by the first magnetic sensor 21. In the region S1, the values of the output signals V1 and V3 satisfy the first condition that V1≥0 and V3>0. In the regions S2 and S3, the values of the output signals V1 and V3 satisfy the second condition that V1>0 and V3≤0. In the region S4, the values of the output signals 1 and V3 satisfy the third condition that V1≤0 and V3<0. In the regions S5 and S6, the values of the output signals 1 and V3 satisfy the fourth condition that V1<0 and V3≥0.

Then, the rotation angle computing device 20 determines that the pole number of the magnetic pole sensed by the third magnetic sensor 23 is larger by five than the pole number of the magnetic pole sensed by the first magnetic sensor 21 when the second condition (V1>0 and V3≤0) or the fourth condition (V1<0 and V3≥0) is satisfied, and determines that the pole number of the magnetic pole sensed by the third magnetic sensor 23 is larger by four than the pole number of the magnetic pole sensed by the first magnetic sensor 21 when neither the second condition nor the fourth condition is satisfied.

Referring back to FIG. 5, when it is determined in step S2 that the current process is not the first process after the start of rotation angle computing process (NO in step S2), the process proceeds to step S4. In step S4, the rotation angle computing device 20 determines whether the zero-crossing, at which the sign of the value of an output signal is inverted, has been detected for each of the output signals V1, V2 and V3 based on the values of the output signals V1, V2 and V3 stored in the memory. When no zero-crossing has been detected (NO in step S4), the rotation angle computing device 20 causes the process to proceed to step S12.

When the zero-crossing of one of the output signals V1, V2 and V3 has been detected in step S4 (YES in step S4), the rotation angle computing device 20 executes the pole number identifying process of step S10 (described later) to determine whether the magnetic poles respectively sensed by the magnetic sensors 21, 22 and 23 have been already identified (step S5). When the magnetic poles respectively detected by the magnetic sensors 21, 22 and 23 have not been identified, the rotation angle computing device 20 executes the process of updating a relative pole number (step S6). Specifically, the rotation angle computing device 20 changes the relative pole number r1, r2 or r3 that is currently set for the magnetic sensor that output the output signal for which the zero-crossing has been detected in step S4, to a number larger by one or a number smaller by one based on the rotation direction of the rotor 1.

When the rotation direction of the rotor 1 is the forward direction (direction indicated by the arrow in FIG. 2), the rotation angle computing device 20 updates the relative pole number r1, r2 or r3, currently set for the magnetic sensor that outputs the output signal for which the zero-crossing has been detected in step S4, to a number larger by one. On the other hand, when the rotation direction of the rotor 1 is the reverse direction, the rotation angle computing device 20 updates the relative pole number r1, r2 or r3, currently set for the magnetic sensor that outputs the output signal for which the zero-crossing has been detected, to a number smaller by one. Note that, as described above, the relative pole number smaller by one than the relative pole number "1" is "16". In addition, the relative pole number larger by one than the relative pole number "16" is "1".

Note that the rotation direction of the rotor 1 is determined based on the immediately preceding value and current value of the output signal for which the zero-crossing has been detected and the current value of one of the other two output signals. Specifically, when the output signal for which the zero-crossing has been detected is the first output signal V1, it is determined that the rotation direction is the forward direction (direction indicated by the arrow in FIG. 2) when the condition that "the immediately preceding value of the first output signal V1 is larger than 0, the current value of the first output signal V1 is smaller than or equal to 0 and the current value of the third output signal V3 is smaller than 0 (or the current value of the second output signal V2 is larger than 0)" or the condition that "the immediately preceding value of the first output signal V1 is smaller than 0, the current value of the first output signal V1 is larger than or equal to 0 and the current value of the third output signal V3 is larger than 0 (or the current value of the second output signal V2 is smaller than 0)" is satisfied.

On the other hand, it is determined that the rotation direction is the reverse direction when the condition that "the immediately preceding value of the first output signal V1 is larger than or equal to 0, the current value of the first output signal V1 is smaller than 0 and the current value of the third output signal V3 is larger than 0 (or the current value of the second output signal V2 is smaller than 0)" or the condition that "the immediately preceding value of the first output signal V1 is smaller than or equal to 0, the current value of the first output signal V1 is larger than 0 and the current value of the third output signal V3 is smaller than 0 (or the current value of the second output signal V2 is larger than 0)" is satisfied.

When the output signal for which the zero-crossing has been detected is the second output signal V2, it is determined that the rotation direction is the forward direction (direction indicated by the arrow in FIG. 2) when the condition that "the immediately preceding value of the second output signal V2 is larger than 0, the current value of the second output signal V2 is smaller than or equal to 0 and the current value of the first output signal V1 is smaller than 0 (or the current value of the third output signal V3 is larger than 0)" or the condition that "the immediately preceding value of the second output signal V2 is smaller than 0, the current value of the second output signal V2 is larger than or equal to 0 and the current value of the first output signal V1 is larger than 0 (or the current value of the third output signal V3 is smaller than 0)" is satisfied. On the other hand, it is determined that the rotation direction is the reverse direction when the condition that "the immediately preceding value of the second output signal V2 is larger than or equal to 0, the current value of the second output signal V2 is smaller than 0 and the current value of the first output signal V1 is larger than 0 (or the current value of the third output signal V3 is smaller than 0)" or the condition that "the immediately preceding value of the second output signal V2 is smaller than or equal to 0, the current value of the second output signal V2 is larger than 0 and the current value of the first output signal V1 is smaller than 0 (or the current value of the third output signal V3 is larger than 0)" is satisfied.

When the output signal for which the zero-crossing has been detected is the third output signal V3, it is determined that the rotation direction is the forward direction (direction indicated by the arrow in FIG. 2) when the condition that "the immediately preceding value of the third output signal V3 is larger than 0, the current value of the third output signal V3 is smaller than or equal to 0 and the current value of the first output signal V1 is larger than 0 (or the current value of the second output signal V2 is smaller than 0)" or the condition that "the immediately preceding value of the third output signal V3 is smaller than 0, the current value of the third output signal V3 is larger than or equal to 0 and the current value of the first output signal V1 is smaller than 0 (or the current value of the second output signal V2 is larger than 0)" is satisfied. On the other hand, it is determined that the rotation direction is the reverse direction when the condition that "the immediately preceding value of the third output signal V3 is larger than or equal to 0, the current value of the third output signal V3 is smaller than 0 and the current value of the first output signal V1 is smaller than 0 (or the current value of the second output signal V2 is larger than 0)" or the condition that "the immediately preceding value of the third output signal V3 is smaller than or equal to 0, the current value of the third output signal V3 is larger than 0 and the current value of the first output signal V1 is larger than 0 (or the current value of the second output signal V2 is smaller than 0)".

When the process of updating a relative pole number in step S6 ends, the rotation angle computing device 20 executes peak value detecting process (step S7). The peak value detecting process will be specifically described. The magnetic sensor that corresponds to the output signal for which the zero-crossing has been detected in step S4 is defined as a peak value detection magnetic sensor. The rotation angle computing device 20 initially determines whether the magnetic pole sensed by the peak value detection magnetic sensor has changed. That is, the rotation angle computing device 20 determines whether the position of the magnetic pole sensed by the peak value detection magnetic sensor at the time point when the zero-crossing of the output signal of the magnetic sensor has been detected in the immediately preceding cycle and the position of the magnetic pole sensed by the peak value detection magnetic sensor at the time point when the zero-crossing has been detected in the current cycle are different or the same. When the rotation direction of the rotor 1 is inverted, the positions of the magnetic poles at both the time points may be the same.

This determination may be, for example, made based on whether the rotation direction of the rotor 1 when the previous zero-crossing has been detected is the same as the current rotation direction of the rotor 1. That is, when the rotation direction of the rotor 1 is the same, the rotation angle computing device 20 determines that the magnetic pole sensed by the peak value detection magnetic sensor has changed. On the other hand, when the rotation direction of the rotor 1 is different, the rotation angle computing device 20 determines that the magnetic pole sensed by the peak value detection magnetic sensor has not changed.

When it is determined that the magnetic pole sensed by the peak value detection magnetic sensor has changed, the rotation angle computing device 20 determines that a peak value has been detected, and then identifies the peak value candidate corresponding to that magnetic sensor as the peak value. On the other hand, when it is determined that the magnetic pole sensed by the peak value detection magnetic sensor has not changed, the rotation angle computing device 20 determines that no peak value has been detected. Note that the peak value includes a local maximum value that is larger than 0 and a local minimum value that is smaller than 0. In this embodiment, the magnetic pole pair sensed by the first magnetic sensor 21 is identified based on the local maximum value of the peak value. In the following description, the local maximum values of the first output signal V1, second output signal V2 and third output signal V3 detected in the peak value detecting process are respectively denoted by P1, P2 and P3 where appropriate.

When no local maximum value has been detected in the peak value detecting process (NO in step S8), the rotation angle computing device 20 resets the peak value candidate, corresponding to the output signal for which the zero-crossing has been detected in step S4, to 0 and then causes the process to proceed to step S12. On the other hand, when a local maximum value has been detected in the peak value detecting process (YES in step S8), the local maximum value is stored as a local maximum value P1, P2 or P3 corresponding to the output signal for which the zero-crossing has been detected in step S4 (step S9). Then, the rotation angle computing device 20 resets the peak value candidate, corresponding to the output signal for which the zero-crossing has been detected in step S4, to 0 and then causes the process to proceed to step S10.

In step S10, the rotation angle computing device 20 executes pole number identifying process (magnetic pole pair identifying process). The concept of the pole number identifying process will be described with reference to FIG. 3. As shown in FIG. 3, a threshold A (A>0) is set at the midpoint between the peak values (local maximum values) of the output signals V1, V2 and V3 for the north magnetic poles m1, m3, m5 and m9 in the magnetic pole pairs M1, M2, M3 and M5 having a weak magnetic force and the peak values (local maximum values) of the output signals V1, V2 and V3 for the north magnetic poles m7, m11, m13 and m15 in the magnetic pole pairs M4, M6, M7 and M8 having a strong magnetic force.

As is apparent from FIG. 3, the combination of the local maximum values of the three output signals V1, V2 and V3 is different among the magnetic pole pairs M1 to M8 sensed by the first magnetic sensor 21. Thus, it is possible to identify the magnetic pole pair sensed by the first magnetic sensor 21 based on the combination of the local maximum values P1, P2 and P3 of the three output signals V1, V2 and V3. In addition, it is possible to identify the magnetic pole sensed by the first magnetic sensor 21 based on the timing at which the magnetic pole pair sensed by the first magnetic sensor 21 is identified.

Then, it is possible to identify the magnetic poles respectively sensed by the second and third magnetic sensors 22 and 23 based on the magnetic pole sensed by the first magnetic sensor 21.

The relationship between the magnetic pole pairs M1 to M8 sensed by the first magnetic sensor 21 and combinations of the local maximum values P1, P2 and P3 of the three output signals V1, V2 and V3 is shown in Table 1.

TABLE 1

|    | M1     | M2     | M3     | M4     | M5     | M6     | M7     | M8     |
|----|--------|--------|--------|--------|--------|--------|--------|--------|
| P1 | P1 < A | P1 < A | P1 < A | P1 > A | P1 < A | P1 > A | P1 > A | P1 > A |
| P2 | P2 < A | P2 < A | P2 > A | P2 < A | P2 > A | P2 > A | P2 > A | P2 < A |
| P3 | P3 < A | P3 > A | P3 < A | P3 > A | P3 > A | P3 > A | P3 < A | P3 < A |

Note that, when the rotor 1 is rotating in the forward direction, the timing at which the magnetic pole pair sensed by the first magnetic sensor 21 is identified is the timing at which the zero-crossing of the third output signal V3 is detected for the first time after the magnetic pole pair sensed by the first magnetic sensor 21 is changed (hereinafter, referred to as "first magnetic pole pair identification timing"). Thus, the magnetic pole pair identified based on the details of Table 1 at the first magnetic pole pair identification timing is the magnetic pole pair that has been sensed by the first magnetic sensor 21 until just before. Therefore, the magnetic pole pair sensed by the first magnetic sensor 21 at the first magnetic pole pair identification timing is the magnetic pole pair that has a magnetic pole pair number larger by one than the magnetic pole pair identified based on the details of Table 1. In addition, the magnetic pole sensed by the first magnetic sensor 21 at the first magnetic pole pair identification timing is a magnetic pole having a north pole between the two magnetic poles of the magnetic pole pair sensed by the first magnetic sensor 21 at the first magnetic pole pair identification timing.

On the other hand, when the rotor 1 is rotating in the reverse direction, the timing at which the magnetic pole pair sensed by the first magnetic sensor 21 is identified is the timing at which the zero-crossing of the first output signal V1 is detected immediately after the magnetic pole pair sensed by the first magnetic sensor 21 is changed (hereinafter, referred to as "second magnetic pole pair identification timing"). Thus, the magnetic pole pair identified based on the details of Table 1 at the second magnetic pole pair identification timing is the magnetic pole pair that has been sensed by the first magnetic sensor 21 until just before. Therefore, the magnetic pole pair sensed by the first magnetic sensor 21 at the second magnetic pole pair identification timing is the magnetic pole pair that has a magnetic pole pair number smaller by one than the magnetic pole pair identified based on the details of Table 1. In addition, the magnetic pole sensed by the first magnetic sensor 21 at the second magnetic pole pair identification timing is a magnetic pole having a south pole between the two magnetic poles of the magnetic pole pair sensed by the first magnetic sensor 21 at the second magnetic pole pair identification timing.

Hereinafter, the pole number identifying process will be more specifically described. The pole number identifying process is executed only when one of the following first condition and second condition is satisfied in the case where the local maximum values of the three output signals V1, V2 and V3 have been already detected (stored).

First Condition The rotation direction of the rotor 1 is the forward direction and the output signal for which the zero-crossing has been detected in step S4 is the third output signal V3.

Second Condition: The rotation direction of the rotor 1 is the reverse direction and the output signal for which the zero-crossing has been detected in step S4 is the first output signal V1.

The first condition is used to determine whether the present time point is the first magnetic pole pair identification timing. When the first condition is satisfied, it is determined that the present time point is the first magnetic pole pair identification timing. The second condition is used to determine whether the present time point is the second magnetic pole pair identification timing. When the second condition is satisfied, it is determined that the present time point is the second magnetic pole pair identification timing.

When the first condition is satisfied, the rotation angle computing device 20 identifies the magnetic pole pair number Q1' of the magnetic pole pair, which has been sensed by the first magnetic sensor 21 until just before, based on the relationship between the magnetic pole pairs M1 to M8 and the combinations of the three local maximum values P1, P2 and P3, shown in Table 1, and the combination of the detected latest local maximum values P1, P2 and P3 of the output signals V1, V2 and V3. Then, the magnetic pole pair number that is larger by one than the magnetic pole pair number Q1' is identified as the magnetic pole pair number Q1 (=Q1'+1) of the magnetic pole pair that is currently sensed by the first magnetic sensor 21.

Subsequently, the rotation angle computing device 20 identifies the pole number q1 of the magnetic pole, currently sensed by the first magnetic sensor 21, based on $q1 = 2 \cdot Q1 - 1$. In addition, the rotation angle computing device 20 identifies the pole number q2 of the magnetic pole, sensed by the second magnetic sensor 22, based on the pole number q1 of the magnetic pole sensed by the first magnetic sensor 21 and the first and second relative pole numbers r1 and r2. Specifically, the rotation angle computing device 20 identifies the pole number q2 of the magnetic pole, sensed by the second magnetic sensor 22, based on $q2 = (q1 - r1) + r2$.

Furthermore, the rotation angle computing device 20 identifies the pole number q3 of the magnetic pole, sensed by the third magnetic sensor 23, based on the pole number q1 of the magnetic pole sensed by the first magnetic sensor 21 and the first and third relative pole numbers r1 and r3. Specifically, the rotation angle computing device 20 identifies the pole number q3 of the magnetic pole, sensed by the third magnetic sensor 23, based on $q3 = (q1 - r1) + r3$. Then, the process proceeds to step S12.

On the other hand, when the second condition is satisfied, the rotation angle computing device 20 identifies the magnetic pole pair number Q1' of the magnetic pole pair, which has been sensed by the first magnetic sensor 21 until just before, based on the relationship between the magnetic pole pairs M1 to M8 and the combinations of the three local maximum values P1, P2 and P3, shown in Table 1, and the combination of the detected latest local maximum values P1, P2 and P3 of the output signals V1, V2 and V3. Then, the magnetic pole pair number that is smaller by one than the magnetic pole pair number Q1' is identified as the magnetic pole pair number Q1 (=Q1'−1) of the magnetic pole pair that is currently sensed by the first magnetic sensor 21.

Subsequently, the rotation angle computing device 20 identifies the pole number q1 of the magnetic pole, currently sensed by the first magnetic sensor 21, based on q1=2·Q1. In addition, the rotation angle computing device 20 identifies the pole number q2 of the magnetic pole, sensed by the second magnetic sensor 22, based on q2=(q1−r1)+r2. Furthermore, the rotation angle computing device 20 identifies the pole number q3 of the magnetic pole, sensed by the third magnetic sensor 23, based on q3 (q1−r1)+r3. Then, the process proceeds to step S12.

Note that, when it is determined in step S10 that the local maximum values P1, P2 and P3 of the three output signals V1, V2 and V3 have not been detected (stored) or when it is determined that neither the first condition nor the second condition is satisfied even when the local maximum values P1, P2 and P3 of the three output signals V1, V2 and V3 have been detected, the rotation angle computing device 20 causes the process to proceed to step S12 without executing the above described pole number identifying process.

When it is determined in step S5 that the magnetic poles respectively sensed by the magnetic sensors 21, 22 and 23 have been already identified (YES in step S5), the rotation angle computing device 20 resets the peak value candidate corresponding to the output signal for which the zero-crossing has been detected in step S4 to 0 and then executes the process of updating a pole number (step S11). Specifically, the rotation angle computing device 20 changes the pole number q1, q2 or q3 that has been already identified for the magnetic sensor that outputs the output signal for which the zero-crossing has been detected in step S4, to a pole number that is larger by one or a pole number that is smaller by one based on the rotation direction of the rotor 1.

When the rotation direction of the rotor 1 is the forward direction, the rotation angle computing device 20 updates the pole number q1, q2 or q3 that has been already identified for the magnetic sensor that outputs the output signal for which the zero-crossing has been detected, to a pole number larger by one. On the other hand, when the rotation direction of the rotor 1 is the reverse direction, the rotation angle computing device 20 updates the pole number q1, q2 or q3 that has been already identified for the magnetic sensor that outputs the output signal for which the zero-crossing has been detected, to a pole number smaller by one. Note that, the pole number smaller by one than the pole number "1" is "16". In addition, the pole number larger by one than the pole number "16" is "1". When the process of updating a pole number in step S11 ends, the rotation angle computing device 20 causes the process to proceed to step S12.

In step S12, the rotation angle computing device 20 executes the amplitude correction process. That is, when the pole numbers q1, q2 and q3 of the magnetic poles respectively sensed by the magnetic sensors 21, 22 and 23 have been identified, the rotation angle computing device 20 corrects the amplitudes of the output signals V1, V2 and V3 of the respective magnetic sensors 21, 22 and 23. On the other hand, when the pole numbers q1, q2 and q3 of the magnetic poles respectively sensed by the magnetic sensors 21, 22 and 23 have not been identified, the rotation angle computing device 20 causes the process to proceed to step S13 without executing the amplitude correction process.

When the pole numbers q1, q2 and q3 of the magnetic poles respectively sensed by the magnetic sensors 21, 22 and 23 have been identified, the rotation angle computing device 20 acquires the peak value of the first output signal V1 corresponding to the pole number q1 of the magnetic pole sensed by the first magnetic sensor 21, the peak value of the second output signal V2 corresponding to the pole number q2 of the magnetic pole sensed by the second magnetic sensor 22 and the peak value of the third output signal V3 corresponding to the pole number q3 of the magnetic pole sensed by the third magnetic sensor 23, from the peak value table (see FIG. 4). The peak values of the first, second and third output signals V1, V2 and V3, acquired from the peak value table, are respectively denoted by P1$x$, P2$x$ and P3$x$. Then, the amplitudes of the output signals V1, V2 and V3 are corrected based on the acquired peak values (amplitude correction values) P1$x$, P2$x$ and P3$x$ and a preset reference amplitude $\phi$.

Specifically, when signals obtained by correcting the amplitudes of the first, second and third output signals V1, V2 and V3 are respectively denoted by V1', V2' and V3', the corrected first, second and third output signals V1', V2' and V3' are respectively computed based on Equations 2, 3 and 4 below.

$$V1'=(V1/P1x)\times\phi \qquad \text{Equation 2}$$

$$V2'=(V2/P2x)\times\phi \qquad \text{Equation 3}$$

$$V3'=(V3/P3x)\times\phi \qquad \text{Equation 4}$$

When the amplitude correction process ends, the rotation angle computing device 20 causes the process to proceed to step S13. In step S13, the rotation angle computing device 20 computes the electric angle $\theta e$ based on the output signals V1', V2' and V3' of which the amplitudes are corrected in step S12 (corrected output signals V1', V2' and V3'). However, when no amplitude correction is performed in step S12, the electric angle $\theta e$ is computed based on the values of the output signals V1, V2 and V3 read in step S1.

Hereinafter, the case where the electric angle $\theta e$ is computed based on the corrected output signals V1', V2' and V3' will be described. Note that, when the electric angle $\theta e$ is computed based on the values of the output signals V1, V2 and V3 read in step S1, the values of the output signals V1, V2 and V3 are used in place of the corrected output signals V1', V2' and V3', so the description thereof is omitted.

The rotation angle computing device 20 computes the first electric angle $\theta e1$ corresponding to the rotation angle of the rotor 1 based on the corrected first output signal V1' and the corrected third output signal V3'. In addition, the rotation angle computing device 20 computes the second electric angle $\theta e2$ corresponding to the rotation angle of the rotor 1 based on the corrected first output signal V1' and the corrected second output signal V2'. In addition, the rotation angle computing device 20 computes the third electric angle $\theta e3$ corresponding to the rotation angle of the rotor 1 based on the corrected second output signal V2' and the corrected third output signal V3'. A method of computing the first, second and third electric angles $\theta e1$, $\theta e2$ and $\theta e3$ will be described later.

Then, the rotation angle computing device 20, for example, computes the final electric angle $\theta e$ based on Equation 5. That is, the rotation angle computing device 20 computes the mean value of the first, second and third electric angles $\theta e1$, $\theta e2$ and $\theta e3$ as the final electric angle $\theta e$.

$$\theta e=(\theta e1+\theta e2+\theta e3)/3 \qquad \text{Equation 5}$$

Note that the rotation angle computing device 20 may compute the median value of the first, second and third electric angles $\theta e1$, $\theta e2$ and $\theta e3$ as the final electric angle $\theta e$. In addition, the rotation angle computing device 20 may exclude one of the first, second and third electric angles $\theta e1$, $\theta e2$ and $\theta e3$, which is more deviated from the median value thereof than the other, and compute the mean value of the two values other than the excluded one as the final electric angle $\theta e$. Furthermore, the rotation angle computing device 20 may determine one of the first, second and third electric angles $\theta e1$, $\theta e2$ and $\theta e3$ as the final electric angle $\theta e$.

A method of computing the first electric angle $\theta e1$ will be described. Because the reference amplitude is $\phi$, the corrected first output signal is expressed by $\phi \cdot \sin \theta e$, the corrected second output signal V2' is expressed by $\phi \cdot \sin(\theta e+240°)$, and the corrected third output signal V3' is expressed by $\phi \cdot \sin$ ($\theta e \div 120°$). Here, for the sake of convenience of description, the reference amplitude $\phi$ is 1, and the corrected first output signal V1', the corrected second output signal V2' and the corrected third output signal V3' are respectively expressed by V1'=sin $\theta e$, V2'=sin($\theta e$+240°) and V3'=sin($\theta e$+120°).

The rotation angle computing device 20 initially computes a signal $V_{13}$' (=sin($\theta e$+90°)=cos $\theta e$), of which the phase difference from the corrected first output signal V1' is 90°, based on the corrected first output signal V1' (=sin $\theta e$) and the corrected third output signal V3' (=sin($\theta e$+120°). More specifically, the rotation angle computing device 20 computes the signal $V_{13}$' based on Equation 6 below.

$$\begin{aligned}V'_{13} &= \cos\theta e \\ &= \frac{\sin(\theta e + 120°) - \sin\theta e \cdot \cos 120°}{\sin 120°} \\ &= \frac{V3' - V1' \cdot \cos 120°}{\sin 120°} \\ &= \frac{2 \cdot V3' + V1'}{\sqrt{3}}\end{aligned} \qquad (6)$$

Equation 6 is derived based on the equation expanded from sin($\theta e$+120°) by the addition theorem of trigonometric function. Then, the rotation angle computing device 20 computes the first electric angle $\theta e1$ using the signal $V_{13}$' (cos $\theta e$) and the corrected first output signal VP (=sin $\theta e$) based on Equation 7 below.

$$\begin{aligned}\theta e1 &= \tan^{-1}\frac{\sin\theta e}{\cos\theta e} \\ &= \tan^{-1}\frac{V1'}{V'_{13}}\end{aligned} \qquad (7)$$

A method of computing the second electric angle $\theta e2$ will be described. The rotation angle computing device 20 initially generates a signal $V_{12}$' (=sin($\theta e$+90°)=cos $\theta e$), of which the phase difference from the corrected first output signal V1' is 90°, based on the corrected first output signal V1' (=sin $\theta e$) and the corrected second output signal V2' (=sin($\theta e$+240°)). More specifically, the rotation angle computing device 20 generates the signal $V_{12}$' based on Equation 8 below.

$$\begin{aligned}V'_{12} &= \cos\theta e \\ &= \frac{\sin(\theta e + 240°) - \sin\theta e \cdot \cos 240°}{\sin 240°} \\ &= \frac{V2' - V1' \cdot \cos 240°}{\sin 240°} \\ &= \frac{-2 \cdot V2' - V1'}{\sqrt{3}}\end{aligned} \qquad (8)$$

Equation 8 is derived based on the equation expanded from sin($\theta e$+240°) by the addition theorem of trigonometric function. Then, the rotation angle computing device 20 computes the second electric angle $\theta e2$ using the signal $V_{12}$' (=cos $\theta e$) and the corrected first output signal V1' (=sin $\theta e$) based on Equation 9 below.

$$\begin{aligned}\theta e2 &= \tan^{-1}\frac{\sin\theta e}{\cos\theta e} \\ &= \tan^{-1}\frac{V1'}{V'_{12}}\end{aligned} \qquad (9)$$

A method of computing the third electric angle $\theta e3$ will be described. The rotation angle computing device 20 initially computes the electric angle $\theta e3$' (=$\theta e$+120°), which is advanced by 120° with respect to the rotation angle (electric angle) $\theta e$ of the rotor 1, based on the corrected second output signal V2' and the corrected third output signal V3'. Then, the third electric angle $\theta e3$ is computed by subtracting 120° from the obtained rotation angle $\theta e3$'.

The rotation angle computing device 20 generates a signal $V_{23}$' (=sin($\theta e$+120°+90°)), of which the phase difference from the corrected third output signal V3' is 90°, based on the corrected third output signal V3' (=sin($\theta e$+120°)) and the corrected second output signal V2' (=sin($\theta e$+240°)). Where $\theta e'$=$\theta e$+120°, the corrected third output signal V3' is expressed by the sinusoidal signal sin $\theta e'$ and the corrected second output signal V2' is expressed by the sinusoidal signal sin($\theta e$+120°) of which the phase difference is advanced by 120° from the sinusoidal signal sin $\theta e'$, the signal $V_{23}$' (=sin ($\theta e'$+90°)=cos $\theta e'$) of which the phase difference from the sinusoidal signal sin $\theta e'$ is 90° is obtained as in the case of the method of computing the first electric angle $\theta e1$. Specifically, the rotation angle computing device 20 generates the signal $V_{23}$' based on Equation 10 below.

$$\begin{aligned}V'_{23} &= \cos\theta e' \\ &= \frac{\sin(\theta e' + 120°) - \sin\theta e' \cdot \cos 120°}{\sin 120°} \\ &= \frac{\sin(\theta e + 240°) - \sin(\theta + 120°) \cdot \cos 120°}{\sin 120°} \\ &= \frac{V2' - V3' \cdot \cos 120°}{\sin 120°} \\ &= \frac{2 \cdot V2' + V3'}{\sqrt{3}}\end{aligned} \qquad (10)$$

Subsequently, the rotation angle computing device 20 computes the rotation angle $\theta e3$' using the signal $V_{23}$' (=cos $\theta e'$) and the corrected third output signal V3' (=sin $\theta e'$=sin ($\theta e$+120°)) based on Equation 11.

$$\begin{aligned}\theta e3' &= \tan^{-1}\frac{\sin\theta e'}{\cos\theta e'} \\ &= \tan^{-1}\frac{V3'}{V'_{23}}\end{aligned} \qquad (11)$$

Then, the rotation angle computing device 20 computes the third electric angle $\theta e3$ based on Equation 12.

$$\theta e3 = \theta e3' - 120° \qquad \text{Equation 12}$$

When the electric angle $\theta e$ is computed in step S8, the rotation angle computing device 20 computes the mechanical angle (absolute angle) $\theta m$ of the rotor 1. Specifically, the rotation angle computing device 20 computes the mechanical angle $\theta m$ using the electric angle $\theta e$ computed in step S13 and the magnetic pole pair number Q1 corresponding to the pole number q1 sensed by the first magnetic sensor 21 based on Equation 13.

$$\theta m = \{\theta e + (Q1-1) \times 360°\}/8 \qquad \text{Equation 13}$$

The rotation angle computing device 20 gives the electric angle $\theta e$ computed in step S13 and the mechanical angle $\theta m$ computed in step S14 to the motor controller 30. Then, the process in the current computation cycle ends.

According to the first embodiment, the rotation angle computing device 20 is able to compute the electric angle $\theta e$ and mechanical angle $\theta m$ of the rotor 1 in each predetermined computation cycle and to give the computed electric angle $\theta e$ and mechanical angle $\theta m$ to the motor controller 30. In addition, the rotation angle computing device 20 is able to identify the magnetic poles respectively sensed by the magnetic sensors 21, 22 and 23 immediately after all the local maximum values of the first output signal V1, second output signal V2 and third output signal V3 have been detected after the start of rotation angle computing process. Thus, after the start of rotation angle computing process, it is possible to identify the magnetic poles respectively sensed by the magnetic sensors 21, 22 and 23 after the rotor 1 (brushless motor) starts rotating and before one rotation of the rotor 1 is completed. That is, after the start of rotation angle computing process, it is possible to identify the magnetic poles respectively sensed by the magnetic sensors 21, 22 and 23 in the early stage immediately after the rotor 1 starts rotating.

The first embodiment of the invention is described above; however, the invention may be modified into another embodiment. For example, in the first embodiment, the magnetic pole pair sensed by the first magnetic sensor 21 is identified based on the combination of the local maximum values of the three output signals V1, V2 and V3; instead, the magnetic pole pair sensed by the first magnetic sensor 21 may be identified based on the combination of the local minimum values of the three output signals V1, V2 and V3.

In addition, the number of the magnetic pole pairs, the number of the magnetic sensors, the arrangement pattern of the magnetic pole pairs having a weak magnetic force and the magnetic pole pairs having a strong magnetic force and the arrangement positions of the magnetic sensors are not limited to the ones described in the above embodiment. That is, the number of the magnetic pole pairs, the number of the magnetic sensors, the arrangement pattern of the magnetic pole pairs having a weak magnetic force and the magnetic pole pairs having a strong magnetic force and the arrangement positions of the magnetic sensors may be set such that the combination of the peak values (local maximum values or local minimum values) of the respective magnetic sensors differs among the magnetic pole pairs sensed by one reference magnetic sensor.

Furthermore, even in the same magnetic pole pair, different magnitudes may be set for the positive and negative peak values to thereby determine the magnetic pole sensed by the first magnetic sensor. That is, determination may be made not by magnetic pole pairs but by magnetic poles. FIG. 8 is a schematic view that shows the configuration of a second embodiment in the case where the invention is applied to a torque detection device of a vehicle steering system.

The vehicle steering system includes an input shaft 51, an output shaft 52 and a torsion bar spring (coupling shaft) 53. The torsion bar spring 53 couples these shafts 51 and 52. A steering member 54, such as a steering wheel, is coupled to the input shaft 51. An intermediate shaft (not shown) is coupled to the output shaft 52. The torque detection device includes a first rotation angle detection device, a second rotation angle detection device and a torque computing unit 20C. The first rotation angle detection device detects the rotation angle of the output shaft 52. The second rotation angle detection device detects the rotation angle of the input shaft 51. The torque computing unit 20C computes the torque (steering torque) applied to the input shaft 51 based on the rotation angle of the output shaft 52, detected by the first rotation angle detection device, and the rotation angle of the input shaft 51, detected by the second rotation angle detection device.

The first rotation angle detection device includes a first magnet (multi-polar magnet) 2A, three magnetic sensors 21, 22 and 23 and a first rotation angle computing unit 20A. The first magnet (multi-polar magnet) 2A is coupled to the output shaft 52 so as to be rotatable together with the output shaft 52. The three magnetic sensors 21, 22 and 23 respectively output sinusoidal signals having a phase difference from with rotation of the first magnet 2A. The first rotation angle computing unit 20A computes the rotation angle (electric angle θeA and mechanical angle θmA) of the output shaft 52 based on the output signals V1, V2 and V3 of the three magnetic sensors 21, 22 and 23, and the like.

The second rotation angle detection device includes a second magnet (multi-polar magnet) 2B, three magnetic sensors 24, 25 and 26 and a second rotation angle computing device 20B. The second magnet (multi-polar magnet) 2B is coupled to the input shaft 51 so as to be rotatable together with the input shaft 51. The three magnetic sensors 24, 25 and 26 respectively output sinusoidal signals having a phase difference with rotation of the second magnet 2B. The second rotation angle computing device 20B computes the rotation angle (electric angle θeB and mechanical angle θmB) of the input shaft 51 based on the output signals V4, V5 and V6 of the three magnetic sensors 24, 25 and 26, or the like.

The first rotation angle computing unit 20A, the second rotation angle computing unit 20B and the torque computing unit 20C are implemented by an electronic control unit (ECU) 60 that includes a microcomputer. The microcomputer includes a CPU and a memory (ROM, RAM, nonvolatile memory, or the like). The memory stores programs, and the like.

Figure 9:
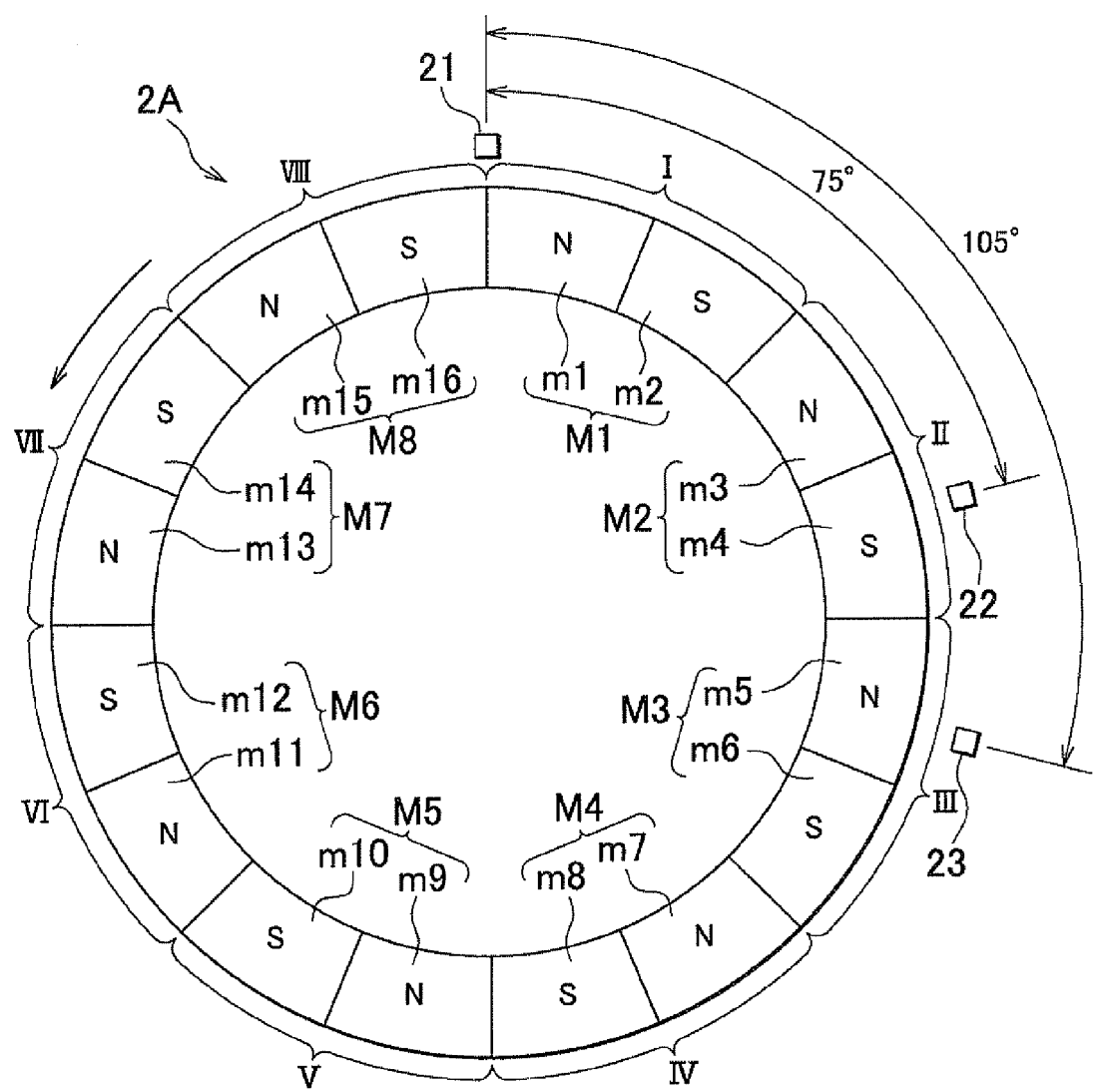
FIG. 9 is a schematic view that shows the configuration of a first magnet.

FIG. 9 is a schematic view that shows the configuration of the first magnet 2A. The first magnet 2A has a cylindrical shape. The first magnet 2A has eight magnetic pole pairs M1 to M8 as in the case of the magnet 2 of the first embodiment. The eight magnetic pole pairs M1 to M8 are arranged at equiangular intervals in the circumferential direction. That is, the first magnet 2A has sixteen magnetic poles m1 to m16 that are arranged at equiangular intervals. Angular regions corresponding to the magnetic pole pairs M1 to M8 in the first magnet 2A may be respectively referred to as a first region I to an eighth region VIII. The angular width of each of the regions I to VIII is 45° (mechanical angle).

There are two types of the magnitude of magnetic force in the magnetic pole pairs of the first magnet 2A, that is, a relatively large first magnetic force and a second magnetic force that is smaller than the first magnetic force. The arrangement pattern of the magnetic pole pairs having the first magnetic force and the magnetic pole pairs having the second magnetic force in the first magnet 2A is the same as the arrangement pattern of the eight magnetic pole pairs of the magnet 2 of the first embodiment. Specifically, among the eight magnetic pole pairs M1 to M8, the magnetic forces of the relative magnetic pole pair numbers M1, M2, M3 and M5 are set at the second magnetic force (weak magnetic force), and the magnetic forces of the relative magnetic pole pair numbers M4, M6, M7 and M8 are set at the first magnetic force (strong magnetic force).

The three magnetic sensors 21, 22 and 23 are arranged around the first magnet 2A. These three magnetic sensors 21, 22 and 23 may be respectively referred to as the first magnetic sensor 21, the second magnetic sensor 22 and the third magnetic sensor 23. In FIG. 9, the second magnetic sensor 22 is arranged at a position spaced apart by 75° (600° in electric angle) in the clockwise direction from the first magnetic sensor 21 about the rotation axis of the first magnet 2A. The third magnetic sensor 23 is arranged at a position spaced apart by 105° (840° in electric angle) in the clockwise direction from the first magnetic sensor 21 about the rotation axis of the first magnet 2A.

In other words, the three magnetic sensors 21, 22 and 23 are arranged such that, when the first magnetic sensor 21 faces the position at 0° in electric angle in the first magnetic pole pair M1, the second magnetic sensor 22 faces the position at 240° in electric angle in the second magnetic pole pair M2 and the third magnetic sensor 23 faces the position at 120° in electric angle in the third magnetic pole pair M3. The direction indicated by the arrow in FIG. 9 is defined as the forward rotation direction of the first magnet 2A. Then, as the first magnet 2A is rotated in the forward direction, the rotation angle of the first magnet 2A increases; whereas, as the first magnet 2A is rotated in the reverse direction, the rotation angle of the first magnet 2A reduces. The magnetic sensors 21, 22 and 23 respectively output sinusoidal signals V1, V2 and V3. During one rotation of each of the sinusoidal signals V1, V2 and V3, the first magnet 2A rotates an angle (45° (360° in electric angle)) corresponding to a single magnetic pole pair.

The angular range of one rotation of the first magnet 2A is divided into eight sections corresponding to the eight magnetic pole pairs M1 to M8, and then the angle of the first magnet 2A, which is expressed on the condition that the start position of each section is 0° and the end position of each section is 360°, is termed the electric angle θeA of the first magnet 2A (the electric angle of the output shaft 52). Here, the first magnetic sensor 21 outputs the output signal V1 (=A1·sin θeA) for each section corresponding to one of the eight magnetic pole pairs M1 to M8. In this case, the second magnetic sensor 22 outputs the output signal V2 (=A2·sin (θeA+600°)=A2·sin(θeA+240°)) for each section corresponding to one of the eight magnetic pole pairs M1 to M8. In addition, the third magnetic sensor 23 outputs the output signal V3 (=A3·sin(θeA+840°)=A3·sin(θeA+120°)) for each section corresponding to one of the eight magnetic pole pairs M1 to M8. A1, A2 and A3 respectively indicate amplitudes. However, the amplitudes A1, A2 and A3 change according to the magnitude of magnetic force of each of the magnetic pole pairs M1 to M8.

Thus, the magnetic sensors 21, 22 and 23 respectively output sinusoidal signals having a predetermined phase difference 120° (electric angle). The output signals of the magnetic sensors 21, 22 and 23 may be respectively termed the first output signal V1, the second output signal V2 and the third output signal V3. Referring back to FIG. 8, the output signals V1, V2 and V3 of the respective magnetic sensors 21, 22 and 23 are input into the first rotation angle computing unit 20A. The first rotation angle computing unit 20A executes rotation angle computing process similar to the rotation angle computing process (see FIG. 5) executed by the rotation angle computing device 20 according to the first embodiment to identify one of the region numbers I to VIII of the region corresponding to the magnetic pole pair sensed by the first magnetic sensor 21 and then compute the rotation angle (electric angle θeA and mechanical angle θmA) of the first magnet 2A (output shaft 52).

Figure 10:
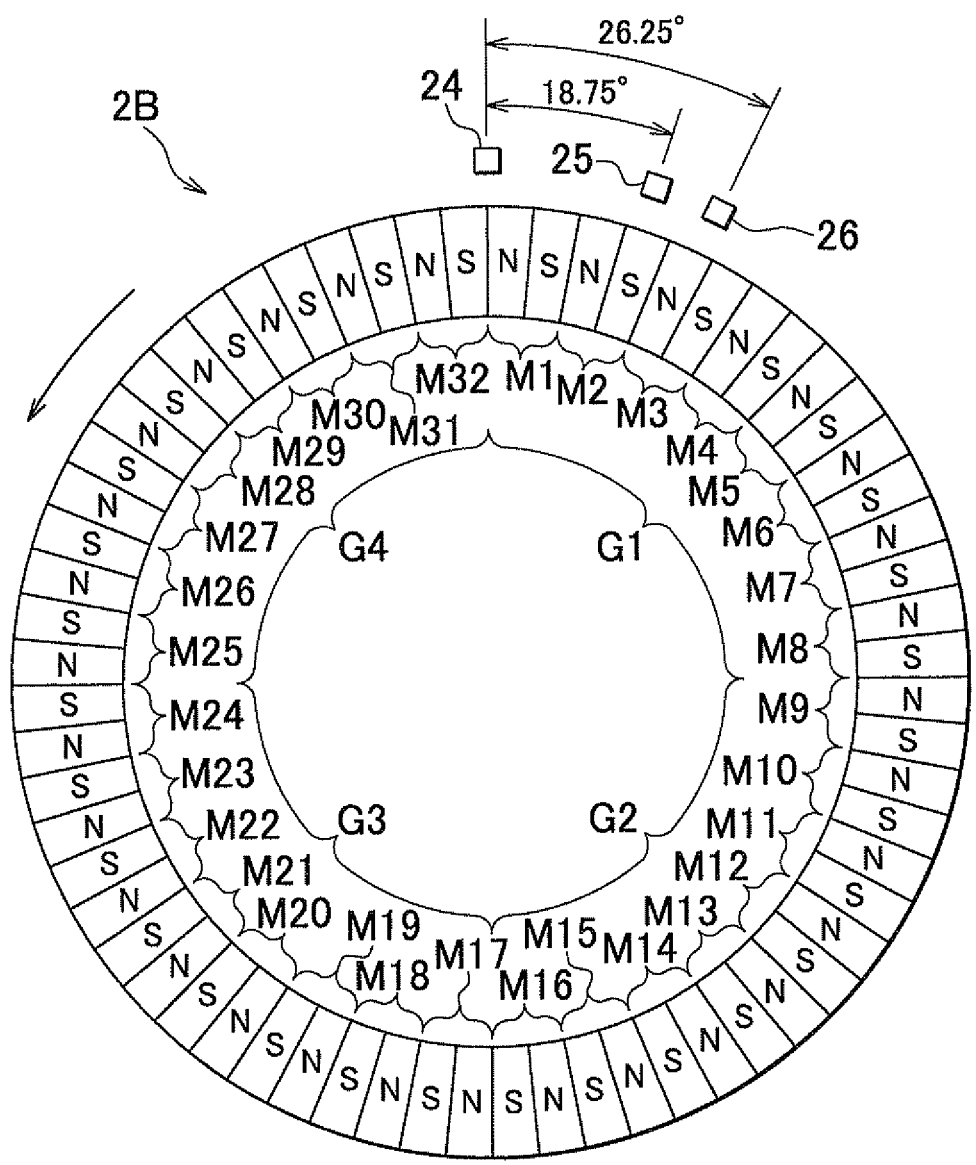
FIG. 10 is a schematic view that shows the configuration of a second magnet.

FIG. 10 is a schematic view that shows the second magnet 2B. The second magnet 2B has a cylindrical shape. The second magnet 2B has thirty-two magnetic pole pairs M1 to M32 that are arranged at equiangular intervals in the circumferential direction. That is, the second magnet 2B has sixty-four magnetic poles that are arranged at equiangular intervals. Among the thirty-two magnetic pole pairs M1 to M32, a magnetic pole pair group formed of M1 to M8 may be referred to as first group G1, a magnetic pole pair group formed of M9 to M16 may be referred to as second group G2, a magnetic pole pair group formed of M17 to M24 may be referred to as third group G3 and a magnetic pole pair group formed of M25 to M32 may be referred to as fourth group G4.

Numbers 1 to 8 allocated to the eight magnetic pole pairs in each of the groups G1 to G4 are referred to as relative magnetic pole pair numbers [1] to [8]. There are two types of the magnitude of magnetic force in the magnetic pole pairs in the second magnet 2B, that is, a relatively large first magnetic force and a second magnetic force that is smaller than the first magnetic force. The arrangement pattern of the magnetic pole pairs having the first magnetic force and the magnetic pole pairs having the second magnetic force in each of the groups G1 to G4 is the same as the arrangement pattern of the eight magnetic pole pairs M1 to M8 of the magnet 2 of the first embodiment. Specifically, among the eight magnetic pole pairs [1] to [8] in each group, the magnetic forces of the magnetic pole pairs respectively having the relative magnetic pole pair numbers [1], [2], [3] and [5] are set at the second magnetic force (weak magnetic force), and the magnetic forces of the magnetic pole pairs respectively having the relative magnetic pole pair numbers [4], [6], [7] and [8] are set at the first magnetic force (strong magnetic force).

The three magnetic sensors 24, 25 and 26 are arranged around the second magnet 2B. These three magnetic sensors 24, 25 and 26 may be respectively referred to as the fourth magnetic sensor 24, the fifth magnetic sensor 25 and the sixth magnetic sensor 26. In FIG. 10, the fifth magnetic sensor 25 is arranged at a position spaced apart by 18.75° (600° in electric angle) in the clockwise direction from the fourth magnetic sensor 24 about the rotation axis of the second magnet 213. The sixth magnetic sensor 26 is arranged at a position spaced apart by 26.25° (840° in electric angle) in the clockwise direction from the fourth magnetic sensor 24 about the rotation axis of the second magnet 28.

In other words, the three magnetic sensors 24, 25 and 26 are arranged such that, when the fourth magnetic sensor 24 faces the position at 0° in electric angle in the first magnetic pole pair M1, the fifth magnetic sensor 25 faces the position at 240° in electric angle in the second magnetic pole pair M2 and the sixth magnetic sensor 26 faces the position at 120° in electric angle in the third magnetic pole pair M3. The direction indicated by the arrow in FIG. 10 is defined as the forward rotation direction of the second magnet 2B. Then, as the second magnet 2B is rotated in the forward direction, the rotation angle of the second magnet 213 increases; whereas, as the second magnet 213 is rotated in the reverse direction, the rotation angle of the second magnet 2B reduces. The magnetic sensors 24, 25 and 26 respectively output sinusoidal signals V4, V5 and V6. During one period of each of the sinusoidal signals V4, V5 and V6, the second magnet 2B rotates an angle (11.25° (360° in electric angle)) corresponding to a single magnetic pole pair.

The angular range of one rotation of the second magnet 2B is divided into thirty-two sections corresponding to the thirty-two magnetic pole pairs M1 to M32, and then the angle of the second magnet 2B, which is expressed on the condition that the start position of each section is 0° and the end position of each section is 360', is termed the electric angle θeB of the second magnet 2B (the electric angle of the input shaft 51). Here, the fourth magnetic sensor 24 outputs the output signal V4 (=A4·sin θeB) for each section corresponding to one of the thirty-two magnetic pole pairs M1 to M32. In this case, the fifth magnetic sensor 25 outputs the output signal V5 (=A5·sin(θeB+600°=)=A5·sin(θeB+240°)) for each section corresponding to one of the thirty-two magnetic pole pairs M1 to M32. In addition, the sixth magnetic sensor 26 outputs the output signal V6 (=A6·sin(θeB+840°))=A6·sin(θeB+120°)) for each section corresponding to one of the thirty-two magnetic pole pairs M1 to M32. A4, A5 and A6 respectively indicate amplitudes. However, the amplitudes A4, A5 and A6 change according to the magnitude of magnetic force of each of the magnetic pole pairs M1 to M32.

Thus, the magnetic sensors 24, 25 and 26 respectively output sinusoidal signals having a predetermined phase difference 120° (electric angle). The output signals V4, V5 and V6 of the magnetic sensors 24, 25 and 26 may be respectively referred to as the fourth output signal V4, the fifth output signal V5 and the sixth output signal V6. Referring back to FIG. 8, the output signals V4, V5 and V6 of the magnetic sensors 24, 25 and 26 are input into the second rotation angle computing unit 20B. The second rotation angle computing unit 20B executes rotation angle computing process shown in FIG. 11 to compute the rotation angle (electric angle θeB and mechanical angle θmB) of the second magnet 2B (input shaft 51). Note that the peak value for each magnetic pole of the first magnet 2A and the peak value for each magnetic pole of the second magnet 2B are stored in the nonvolatile memory in the form of a peak value table as in the case of the first embodiment.

Figure 11:
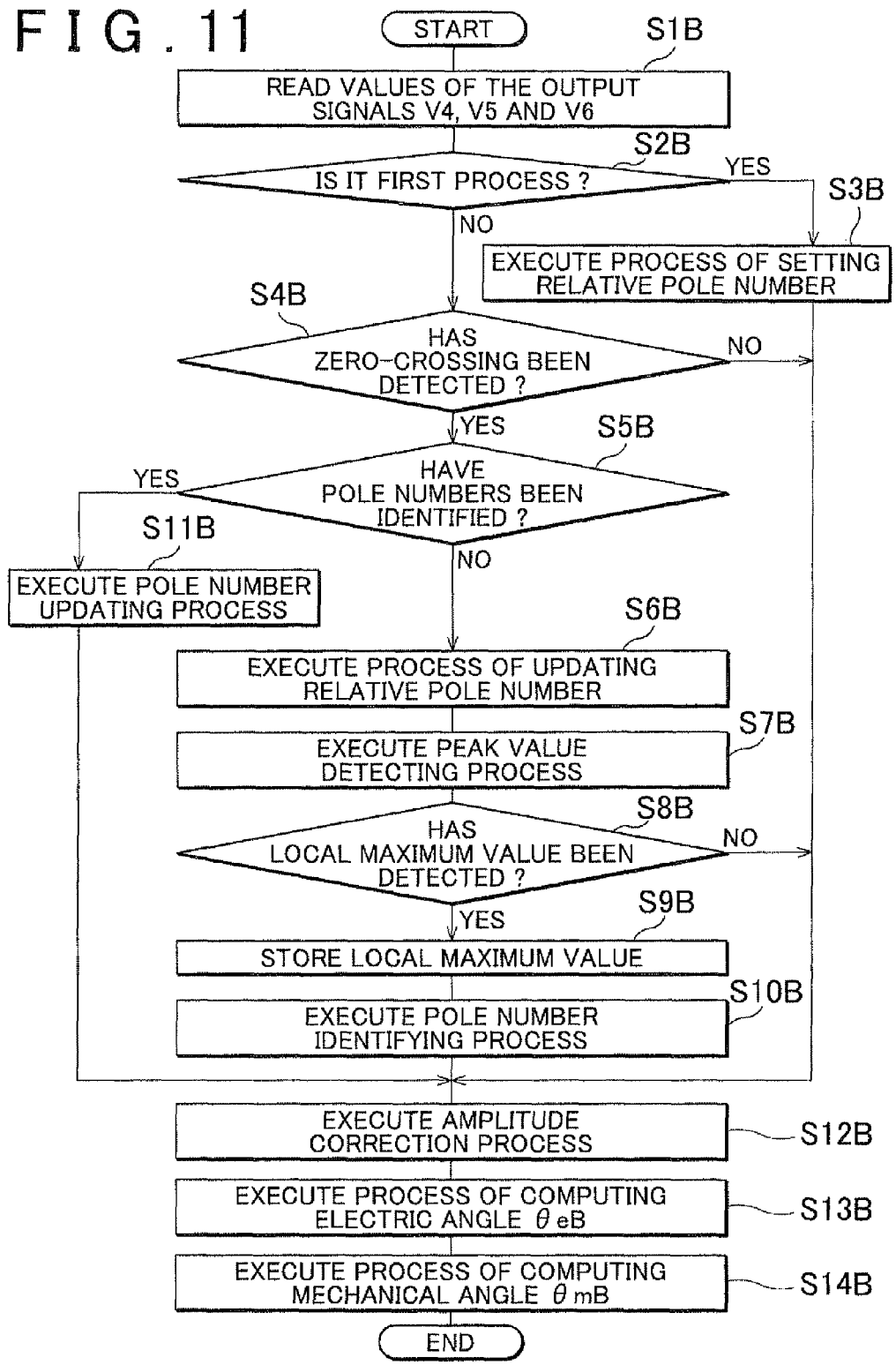
FIG. 11 is a flowchart that shows the procedure of a rotation angle computing process executed by a second rotation angle computing unit.

FIG. 11 is a flowchart that shows the procedure of rotation angle computing process executed by the second rotation angle computing unit 20B. The rotation angle computing process shown in FIG. 11 is repeatedly executed at predetermined computation intervals. A relative number, allocated to each magnetic pole such that the magnetic pole sensed by the fourth magnetic sensor 24 at the time of the start of rotation angle computing process is set as a reference magnetic pole, is defined as a relative pole number. The relative pole number of the magnetic pole sensed by the fourth magnetic sensor 24 (hereinafter, referred to as "fourth relative pole number") is denoted by a variable r4, the relative pole number of the magnetic pole sensed by the fifth magnetic sensor 25 (hereinafter, referred to as "fifth relative pole number") is denoted by a variable r5, and the relative pole number of the magnetic pole sensed by the sixth magnetic sensor 26 (hereinafter, referred to as "sixth relative pole number") is denoted by a variable r6. Note that each of the relative pole numbers r4, r5 and r6 is an integer of from 1 to 64, the relative pole number smaller by one than 1 is 64, and the relative pole number larger by one than 64 is 1.

In this embodiment, when the magnetic pole sensed by the fourth magnetic sensor 24 at the time of the start of rotation angle computing process (reference magnetic pole) is a north pole, the relative pole number "1" is allocated to that magnetic pole. On the other hand, when the magnetic pole sensed by the fourth magnetic sensor 24 at the time of the start of rotation angle computing process (reference magnetic pole) is a south pole, the relative pole number "2" is allocated to that magnetic pole.

In addition, the pole number of the magnetic pole sensed by the fourth magnetic sensor 24 is denoted by q4, the pole number of the magnetic pole sensed by the fifth magnetic sensor 25 is denoted by q5, and the pole number of the magnetic pole sensed by the sixth magnetic sensor 26 is denoted by q6. Note that each of the pole numbers q4, q5 and q6 is an integer of from 1 to 64, the pole number smaller by one than 1 is 64, and the pole number larger by one than 64 is 1. In addition, the relative magnetic pole pair number of the magnetic pole pair sensed by the fourth magnetic sensor 24 is denoted by [Q4]. Note that the relative magnetic pole pair number [Q4] is an integer of from 1 to 8, the pole number smaller by one than 1 is 8, and the pole number larger by one than 8 is 1. In addition, the magnetic pole pair number of the magnetic pole pair sensed by the fourth magnetic sensor 24 (absolute magnetic pole pair number) is denoted by Q4. Note that the absolute magnetic pole pair number Q4 is an integer of from 1 to 32, the pole number smaller by one than 1 is 32, and the pole number larger by one than 32 is 1.

When the rotation angle computing process is started, the second rotation angle computing unit 20B reads the output signals (output signal values) V4, V5 and V6 of the magnetic sensors 24, 25 and 26 (step S1B). Note that the memory (for example, RAM) of the second rotation angle computing unit 20B stores multiple sets of output signal values, including the output signal values read a predetermined time before to the latest output signal values read.

In addition, in this embodiment, in order to detect the peak value (local maximum value or local minimum value) of the output signal V4, the output signal value of which the absolute value is larger among the read values of the output signal V4 is saved in the memory as the peak value candidate of the output signal V4. Similarly, in order to detect the peak value (local maximum value or local minimum value) of the output signal V5, the output signal value of which the absolute value is larger among the read values of the output signal V5 is saved in the memory as the peak value candidate of the output signal V5. Similarly, in order to detect the peak value (local maximum value or local minimum value) of the output signal V6, the output signal value of which the absolute value is larger among the read values of the output signal V6 is saved in the memory as the peak value candidate of the output signal V6. However, when the zero-crossing of one of the output signals has been detected, the corresponding peak value candidate is reset to zero at a predetermined timing as will be described later.

When the values of the output signals V4, V5 and V6 are read in step S1B, the second rotation angle computing unit 20B determines whether the current process is the first process after the start of rotation angle computing process (step S2B). When the current process is the first process after the start of rotation angle computing process (YES in step S2B), the second rotation angle computing unit 20B executes the process of setting a relative pole number (step S3B).

The process of setting a relative pole number is similar to the process of setting a relative pole number, described with reference to FIG. 6. However, the first to third output signals V1, V2 and V3 in FIG. 6 are respectively replaced with the fourth to sixth output signals V4, V5 and V6. In addition, the first to third relative pole numbers r1, r2 and r3 in FIG. 6 are respectively replaced with the fourth to sixth relative pole numbers r4, r5 and r6.

When the process of setting a relative pole number in step S3B ends, the second rotation angle computing unit 20B causes the process to proceed to step S12B. When it is determined in step S2B that the current process is not the first process after the start of rotation angle computing process (NO in step S2B), the process proceeds to step S413. In step S4B, the second rotation angle computing unit 20B determines whether the zero-crossing, at which the sign of the value is inverted, has been detected for each of the values of the output signals V4, V5 and V6 based on the values of the output signals V4, V5 and V6 stored in the memory. When no zero-crossing has been detected (NO in step S4B), the second rotation angle computing unit 20B causes the process to proceed to step S12B.

When the zero-crossing of one of the values of the output signals V4, V5 and V6 has been detected in step S4B (YES in step S4B), the second rotation angle computing unit 20B executes pole number identifying process in step S1013 (described later) to determine whether the magnetic poles respectively detected by the magnetic sensors 24, 25 and 26 have been already identified (step S5B). When the magnetic poles respectively detected by the magnetic sensors 24, 25 and 26 have not been identified, the second rotation angle computing unit 20B executes the process of updating a relative pole number (step S6B). Specifically, the relative pole number r4, r5 or r6 currently set for the magnetic sensor that outputs the output signal for which the zero-crossing has been detected in step S4B is updated based on the rotation direction of the rotor 1. More specifically, when the rotation direction of the second magnet 2B is the forward direction (direction indicated by the arrow in FIG. 10), the second rotation angle computing unit 20B updates the relative pole number r4, r5 or r6, currently set for the magnetic sensor that outputs the output signal for which the zero-crossing has been detected in step S4B, to a number larger by one. On the other hand, when the rotation direction of the second magnet 2B is the reverse direction, the second rotation angle computing unit 20B updates the relative pole number r4, r5 or r6, currently set for the magnetic sensor, to a number smaller by one.

When the process of updating a relative pole number in step S6B ends, the second rotation angle computing unit 20B executes peak value detecting process (step S7B). The peak value detecting process will be specifically described. The magnetic sensor that corresponds to the output signal for which the zero-crossing has been detected in step S4B is defined as a peak value detection magnetic sensor. The second rotation angle computing unit 20B initially determines whether the magnetic pole sensed by the peak value detection magnetic sensor has changed. That is, when the rotation direction of the second magnet 2B at the time when the previous zero-crossing has been detected is the same as the current rotation direction of the second magnet 2B, the second rotation angle computing unit 20B determines that the magnetic pole sensed by the peak value detection magnetic sensor has changed. On the other hand, when the rotation direction of the second magnet 2B at the time when the previous zero-crossing has been detected differs from the current rotation direction of the second magnet 2B, the second rotation angle computing unit 20B determines that the magnetic pole sensed by the peak value detection magnetic sensor has not changed.

When it is determined that the magnetic pole sensed by the peak value detection magnetic sensor has changed, the second rotation angle computing unit 20B determines that the peak value has been detected, and then identifies a peak value candidate corresponding to the magnetic sensor as the peak value. On the other hand, when it is determined that the magnetic pole sensed by the peak value detection magnetic sensor has not changed, the second rotation angle computing unit 20B determines that a peak value has not been detected. Note that the peak value includes a local maximum value that is larger than 0 and a local minimum value that is smaller than 0. In this embodiment, the magnetic pole pair sensed by the fourth magnetic sensor 24 is identified based on the local maximum value of the peak value. In the following description, the local maximum values of the fourth output signal V4, fifth output signal V5 and sixth output signal V6 detected in the peak value detecting process are respectively denoted by P4, P5 and P6 where appropriate.

When a local maximum value has not been detected in the peak value detecting process (NO in step S8B), the second rotation angle computing unit 20B resets the peak value candidate, corresponding to the output signal for which the zero-crossing has been detected in step S4B, to 0 and then causes the process to proceed to step S12B. On the other hand, when a local maximum value has been detected in the peak value detecting process (YES in step S8B), the local maximum value is stored as a local maximum value P4, P5 or P6 corresponding to the output signal for which the zero-crossing has been detected in step S4B (step S9B). Then, the second rotation angle computing unit 20B resets the peak value candidate, corresponding to the output signal for which the zero-crossing has been detected in step S4B, to 0 and then causes the process to proceed to step S10B.

In step S10B, the second rotation angle computing unit 20B executes pole number identifying process (magnetic pole pair identifying process). Where a magnetic pole pair pattern in which the array of the eight magnetic pole pairs M1 to M8 in the first embodiment is expressed by the magnitude of magnetic force is set as a reference magnetic pole pair pattern, the magnetic pole pair pattern of each of the groups G1 to G4 in the second magnet 2B is the same as the reference magnetic pole pair pattern. Therefore, the second rotation angle computing unit 20B uses a method similar to the method of identifying the magnetic pole pair number Q1 of the magnetic pole pair sensed by the first magnetic sensor 21 in step S10 of FIG. 5 to make it possible to identify the relative magnetic pole pair number [Q4] of the magnetic pole pair sensed by the fourth magnetic sensor 24.

That is, the second rotation angle computing unit 20B identifies the relative magnetic pole pair number [Q4] of the magnetic pole pair sensed by the fourth magnetic sensor 24 based on the preset relationship between the relative magnetic pole pair numbers [1] to [8] of the magnetic pole pairs sensed by the fourth magnetic sensor 24 and the combinations of the local maximum values P4, P5 and P6 of the output signals V4, V5 and V6, the detected latest local maximum values of the output signals V4, V5 and V6, and the rotation direction of the second magnet 2B (first magnetic pole pair identifying process).

Subsequently, the second rotation angle computing unit 20B identifies the absolute magnetic pole pair number Q4 of the magnetic pole pair sensed by the fourth magnetic sensor 24 based on the relative magnetic pole pair number [Q4] of the magnetic pole pair sensed by the fourth magnetic sensor 24 and one of the region numbers I to VIII, which corresponds to the magnetic pole pair sensed by the first magnetic sensor 21 and which is identified by the first rotation angle computing unit 20A (second magnetic pole pair identifying process).

Figure 12:
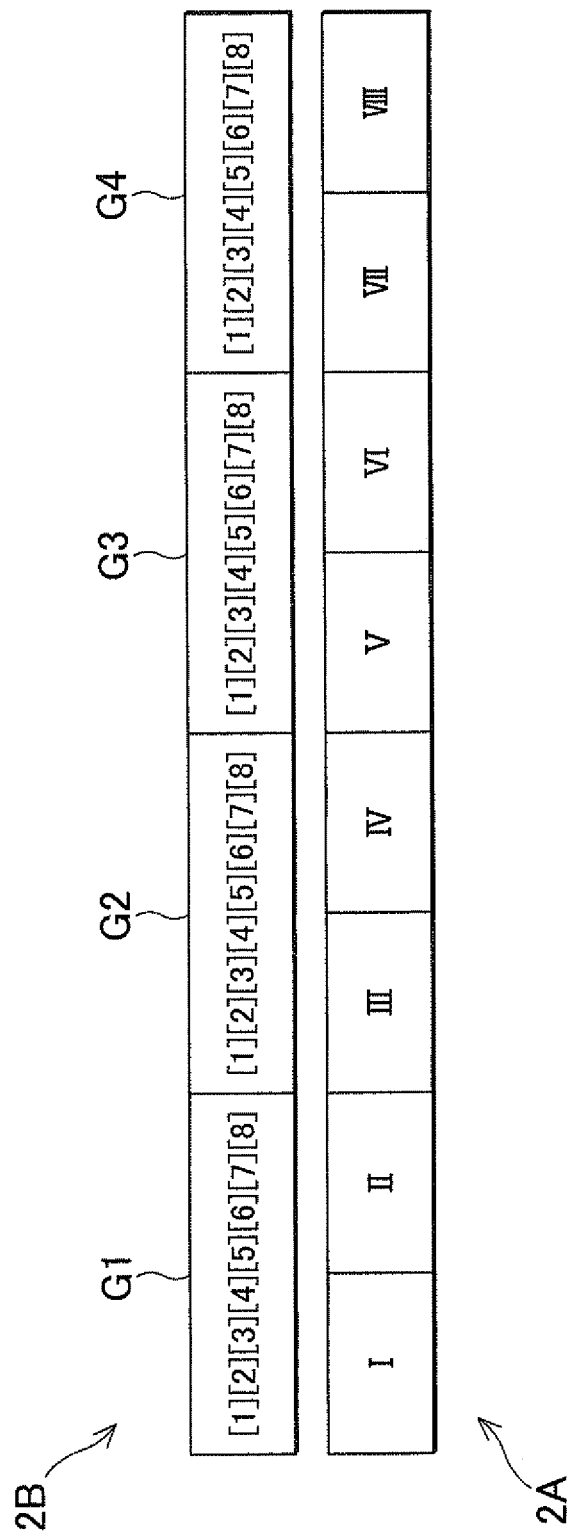
FIG. 12 is a schematic view that schematically shows the relative positional relationship between regions I to VIII of the first magnet and groups G1 to G4 of the second magnet in the case where there is no torsion in a torsion bar spring.
Figure 13:
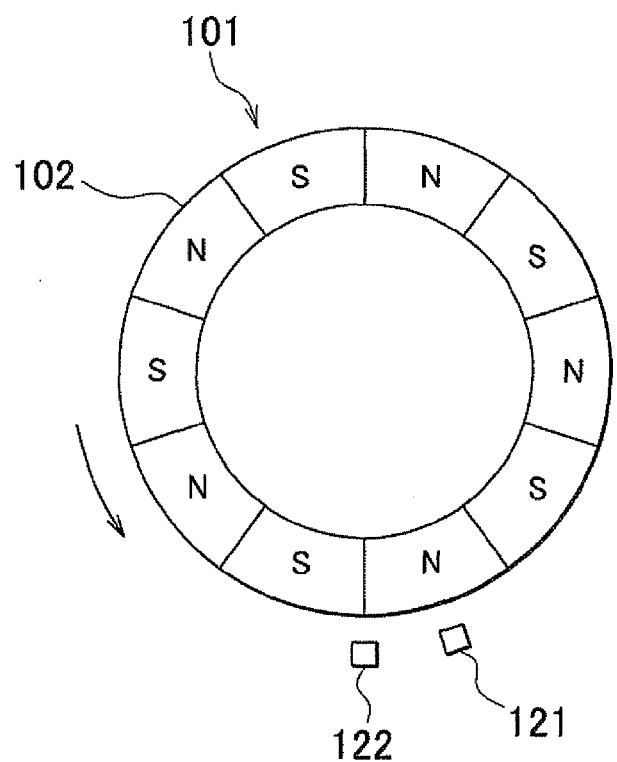
FIG. 13 is a schematic view for illustrating a rotation angle detecting method executed by a conventional rotation angle detection device.
Figure 14:
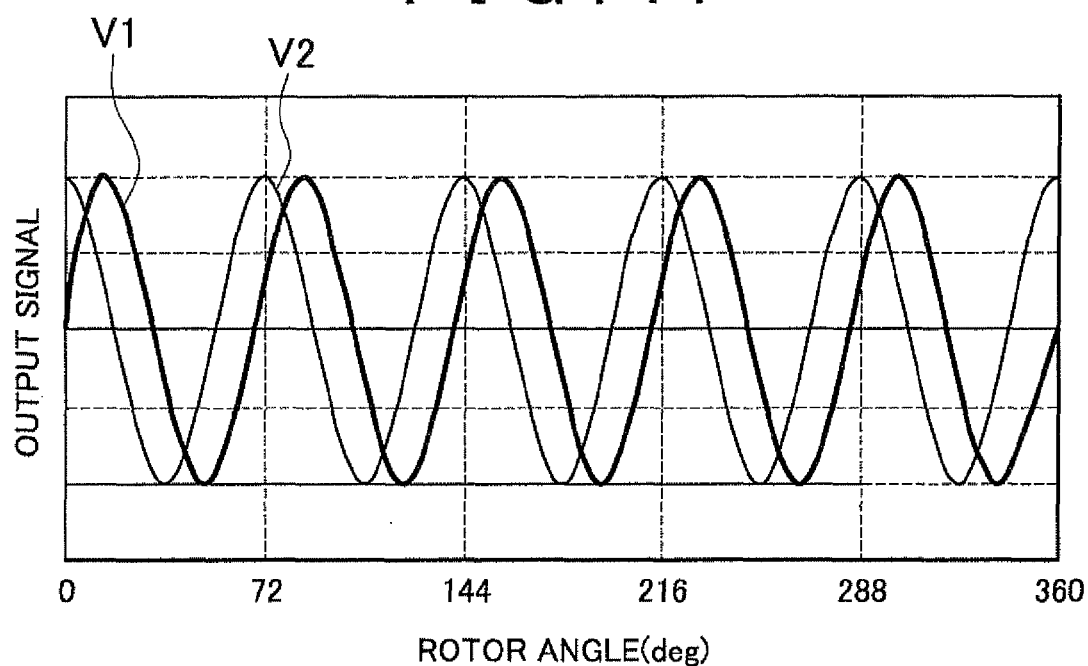
FIG. 14 is a schematic view that shows the output signal waveform of a first magnetic sensor and the output signal waveform of a second magnetic sensor.

FIG. 12 is a schematic view that schematically shows the relative positional relationship between the regions I to VIII of the first magnet 2A and the groups G1 to G4 of the second magnet 2B in the case where there is no torsion in the torsion bar spring 53. If the relative magnetic pole pair number of the magnetic pole pair sensed by the fourth magnetic sensor 24 has been identified as [8] by the second rotation angle computing unit 20B, the magnetic pole pair sensed by the fourth magnetic sensor 24 is one of M8, M16, M34 and M32.

If the magnetic pole pair sensed by the fourth magnetic sensor 24 is M8 in the first group G1, the maximum value of the absolute value of the torsional angle of the torsion bar spring 53 is presumed to be lower than or equal to 15° in mechanical angle, so the magnetic pole pair sensed by the first magnetic sensor 21 is one of the region II and the region III. If the magnetic pole pair sensed by the fourth magnetic sensor 24 is M16 in the second group G2, the magnetic pole pair sensed by the first magnetic sensor 21 is one of the region IV and the region V.

If the magnetic pole pair sensed by the fourth magnetic sensor 24 is M24 in the third group G3, the magnetic pole pair sensed by the first magnetic sensor 21 is one of the region VI and the region VII. If the magnetic pole pair sensed by the fourth magnetic sensor 24 is M32 in the fourth group G4, the magnetic pole pair sensed by the first magnetic sensor 21 is one of the region VIII and the region I.

Thus, when the relative magnetic pole pair number of the magnetic pole pair sensed by the fourth magnetic sensor 24 has been identified as [8] by the second rotation angle computing unit 20B, it is possible to identify the magnetic pole pair sensed by the fourth magnetic sensor 24 as one of M8, M16, M24 and M32 based on one of the region numbers I to VIII, which corresponds to the magnetic pole pair sensed by the first magnetic sensor 21.

Similarly, when the relative magnetic pole pair number identified by the second rotation angle computing unit 20B is a value other than [8], it is possible to identify the magnetic pole pair (absolute magnetic pole pair number) Q4 sensed by the fourth magnetic sensor 24 in consideration of one of the region numbers I to VIII, which corresponds to the magnetic pole pair sensed by the first magnetic sensor 21 and which has been identified by the first rotation angle computing unit 20A. Table 2 shows the relationship between the combination of the relative magnetic pole pair number [Q4] of the magnetic pole pair sensed by the fourth magnetic sensor 24 and one of the region numbers I to VIII, which corresponds to the magnetic pole pair sensed by the first magnetic sensor 21, and the absolute magnetic pole pair number Q4 of the magnetic pole pair sensed by the fourth magnetic sensor 24.

TABLE 2

| | | RELATIVE MAGNETIC POLE PAIR NUMBER [Q4] | | | | | | | | | |
|---|---|---|---|---|---|---|---|---|---|---|---|
| | | [8] | [1] | [2] | [3] | [4] | [5] | [6] | [7] | [8] | [1] |
| REGION NUMBER | I | M32 | M1 | M2 | M3 | M4 | M5 | — | — | — | — |
| | II | — | — | — | — | M4 | M5 | M6 | M7 | M8 | M9 |
| | III | M8 | M9 | M10 | M11 | M12 | M13 | — | — | — | — |
| | IV | — | — | — | — | M12 | M13 | M14 | M15 | M16 | M17 |
| | V | M16 | M17 | M18 | M19 | M20 | M21 | — | — | — | — |
| | VI | — | — | — | — | M20 | M21 | M22 | M23 | M24 | M25 |
| | VII | M24 | M25 | M26 | M27 | M28 | M29 | — | — | — | — |
| | VIII | — | — | — | — | M28 | M29 | M30 | M31 | M32 | M1 |

That is, the second rotation angle computing unit 20B identifies the absolute magnetic pole pair number Q4 of the magnetic pole pair sensed by the fourth magnetic sensor 24 based on the relative magnetic pole pair number [Q4] of the magnetic pole pair sensed by the fourth magnetic sensor 24, one of the region numbers I to VIII identified by the first rotation angle computing unit 20B (region number corresponding to the magnetic pole pair sensed by the first magnetic sensor 21) and the details of Table 2.

As described in the first embodiment, when the rotation direction of the second magnet 2B is the forward direction (direction indicated by the arrow in FIG. 10), the magnetic pole sensed by the fourth magnetic sensor 24 is a magnetic pole having a north pole between the magnetic poles of the magnetic pole pair sensed by the fourth magnetic sensor 24. Thus, in this case, the second rotation angle computing unit 20B identifies the pole number q4 of the magnetic pole currently sensed by the fourth magnetic sensor 24 based on $q4=2 \cdot Q4-1$. In addition, the second rotation angle computing unit 20B identifies the pole number q5 of the magnetic pole sensed by the fifth magnetic sensor 25 based on $q5=(q4-r4)+r5$. Furthermore, the second rotation angle computing unit 20B identifies the pole number q6 of the magnetic pole sensed by the sixth magnetic sensor 26 based on $q6=(q4-r4)+r6$. Then, the process proceeds to step S12B.

On the other hand, when the rotation direction of the second magnet 2B is the reverse direction, the magnetic pole sensed by the fourth magnetic sensor 24 is a magnetic pole having a south pole between the magnetic poles of the magnetic pole pair sensed by the fourth magnetic sensor 24. Thus, in this case, the second rotation angle computing unit 20B identifies the pole number q4 of the magnetic pole currently sensed by the fourth magnetic sensor 24 based on $q4=2 \cdot Q4$. In addition, the second rotation angle computing unit 20B identifies the pole number q5 of the magnetic pole sensed by the fifth magnetic sensor 25 based on $q5=(q4-r4)+r5$. Furthermore, the second rotation angle computing unit 20B identifies the pole number q6 of the magnetic pole sensed by the sixth magnetic sensor 26 based on $q6=(q4-r4)+r6$. Then, the process proceeds to step S12B.

Note that, when the magnetic pole pair sensed by the fourth magnetic sensor 24 has not been identified, for example, when it is determined in step S10B that the local maximum values of the three output signals V4, V5 and V6 have not been detected (stored), or the like, the second rotation angle computing unit 20B causes the process to proceed to step S12B without executing the above described pole number identifying process. When it is determined in step S5B that the magnetic poles respectively sensed by the magnetic sensors 24, 25 and 26 have been already identified (YES in step S5B), the second rotation angle computing unit 20B resets the peak value candidate, corresponding to the output signal for which the zero-crossing has been detected in step S4B, to 0 and then executes the process of updating a pole number (step S11B). Specifically, when the rotation direction of the second magnet 2B is the forward direction, the pole number q4, q5 or q6 that has been already identified for the magnetic sensor that outputs the output signal for which the zero-crossing has been detected is updated to a pole number larger by one; whereas, when the rotation direction of the second magnet 2B is the reverse direction, the pole number q4, q5 or q6 that has been already identified for the magnetic sensor that outputs the output signal for which the zero-crossing has been detected is updated to a pole number smaller by one. As the process of updating a pole number in step S11B ends, the second rotation angle computing unit 20B causes the process to proceed to step S12B.

In step S12B, the second rotation angle computing unit 20B executes amplitude correction process. That is, when the pole numbers q4, q5 and q6 of the magnetic poles respectively sensed by the magnetic sensors 24, 25 and 26 have been identified, the second rotation angle computing unit 20B corrects the amplitudes of the output signals V4, V5 and V6 of the magnetic sensors 24, 25 and 26. The amplitude correction process is similar to the amplitude correction process described in step S12 of FIG. 5, so the description thereof is omitted. On the other hand, when the pole numbers q4, q5 and q6 of the magnetic poles respectively sensed by the magnetic sensors 24, 25 and 26 have not been identified, the second rotation angle computing unit 20B causes the process to proceed to step S13B without executing the amplitude correction process.

When the amplitude correction process ends, the second rotation angle computing unit 20B computes the electric angle θeB of the input shaft 51 based on the output signals V4', V5' and V6' of which the amplitudes have been corrected in step S12B (step S1313). However, when no amplitude correction is performed in step S12B, the electric angle θeB is computed based on the values of the output signals V4, V5 and V6 read in step S13. The process of computing the electric angle θeB, executed in step S13B, is similar to the process of computing the electric angle θe, described in step S13 of FIG. 5, so the description thereof is omitted.

When the electric angle θeB is computed in step 13B, the second rotation angle computing unit 20B computes the mechanical angle (absolute angle) θmB of the input shaft 51 (step S14B). Specifically, the second rotation angle computing unit 20B computes the mechanical angle θ mB using the electric angle θeB computed in step S13B and the magnetic pole pair number Q4 corresponding to the pole number q4 sensed by the fourth magnetic sensor 24 based on Equation 14 below.

$$\theta mB = \{\theta eB + (Q4-1) \times 360°\}/32 \quad \text{Equation 14}$$

The torque computing unit 20C computes a steering torque T based on the mechanical angle θmA of the output shaft 52, computed by the first rotation angle computing unit 20A, the mechanical angle θmB of the input shaft 51, computed by the second rotation angle computing unit 20B, and the spring constant K of the torsion bar spring 53. Specifically, the torque computing unit 20C computes the steering torque T based on Equation 15 below.

$$T = (\theta mA - \theta mB) \times K \quad \text{Equation 15}$$

In the embodiment, it is possible to compute the steering torque T. In addition, it is possible to compute the steering angle θmB that is the rotation angle (mechanical angle) of the input shaft 51 and the rotation angle (mechanical angle) θmA of the output shaft 52. The second magnet 2B fixed to the input shaft 51 has thirty-two magnetic pole pairs, so, after the start of rotation angle computing process, the steering angle θ mB is computed in a considerably early stage immediately after the input shaft 51 starts rotation.

In the embodiment, as shown in FIG. 9, the first magnet 2A has the eight magnetic pole pairs M1 to M8; instead, the first magnet 2A may have sixteen, twenty-four or thirty-two magnetic pole pairs. Thus, two, four or eight magnetic pole pairs are included in each of the regions I to VIII of the first magnet 2A shown in FIG. 9 and FIG. 12. In this case, the first to third magnetic sensors 21, 22 and 23 are arranged such that the angular interval in electric angle between the consecutive two of the first to third magnetic sensors 21, 22 and 23 are equal to the angular interval in electric angle between the consecutive two of the first to third magnetic sensors 21, 22 and 23 shown in FIG. 9.

In addition, in this case, the magnitude of magnetic force of each of the plurality of magnetic pole pairs included in the same region in the first magnet 2A is set to the same strength. Then, the magnitudes of magnetic forces of the magnetic pole pairs in each of the regions I to VIII of the first magnet 2A is set so as to be equal to the magnitudes of magnetic forces of the magnetic pole pairs M1 to M8 in a corresponding one of the regions I to VIII in the first magnet 2A shown in FIG. 9. For example, the magnitude of magnetic force of each magnetic pole pair included in the region I of the first magnet 2A is equal to the magnitude of magnetic force of the magnetic pole pair M1 of the above described first magnet 2A.

Thus, the combination of the local maximum values of the three output signals V1, V2 and V3 differs among the regions I to VIII sensed by the first magnetic sensor 21, so it is possible to identify the region sensed by the first magnetic sensor 21 based on a combination of the local maximum values of the three output signals V1, V2 and V3. Various design changes may be applied the aspect of the invention within the range of the matter recited in the appended claims.

What is claimed is:

1. A rotation angle detection device that detects a rotation angle of a rotor, comprising:
    a multi-polar magnet that rotates with rotation of the rotor, and that has at least one magnetic pole pair having a first magnetic force and at least one magnetic pole pair having a second magnetic force;
    a plurality of magnetic sensors that respectively output sinusoidal output signals having a phase difference with rotation of the multi-polar magnet;
    a peak value detecting unit that detects peak values of output signals of the respective magnetic sensors; and
    a magnetic pole pair identifying unit that identifies one of the magnetic pole pairs, sensed by one of the magnetic sensors, which serves as a reference magnetic sensor, based on a combination of the peak values of the output signals of the respective magnetic sensors, detected by the peak value detecting unit, wherein
    the number of the magnetic pole pairs, the number of the magnetic sensors, an arrangement pattern of the at least one magnetic pole pair having the first magnetic force and the at least one magnetic pole pair having the second magnetic force and arrangement positions of the magnetic sensors are set such that the combination of the peak values of the output signals of the respective magnetic sensors differs among the magnetic pole pairs sensed by the reference magnetic sensor.

2. The rotation angle detection device according to claim 1, further comprising:
    a magnetic pole identifying unit that identifies magnetic poles respectively sensed by at least two magnetic sensors based on the magnetic pole pair identified by the magnetic pole pair identifying unit;
    an amplitude correction unit that corrects amplitudes of the output signals of the at least two magnetic sensors based on the magnetic poles identified by the magnetic pole identifying unit; and
    a rotation angle computing unit that detects the rotation angle of the rotor based on the at least two output signals of which the amplitudes are corrected by the amplitude correction unit.

3. The rotation angle detection device according to claim 1, wherein
    the plurality of magnetic pole pairs are formed of first to eighth magnetic pole pairs,
    the plurality of magnetic sensors are formed of first to third magnetic sensors, and
    the three magnetic sensors are arranged such that, when the first magnetic sensor faces a position at 0° in electric angle in the first magnetic pole pair, the second magnetic sensor faces a position at 240° in electric angle in the second magnetic pole pair and the third magnetic sensor faces a position at 120° in electric angle in the third magnetic pole pair.

4. The rotation angle detection device according to claim 2, wherein
    the plurality of magnetic pole pairs are formed of first to eighth magnetic pole pairs,
    the plurality of magnetic sensors are formed of first to third magnetic sensors, and the three magnetic sensors are arranged such that, when the first magnetic sensor faces a position at 0° in electric angle in the first magnetic pole pair, the second magnetic sensor faces a position at 240° in electric angle in the second magnetic pole pair and the third magnetic sensor faces a position at 120° in electric angle in the third magnetic pole pair.

5. A torque detection device that includes a coupling shaft that couples a first shaft to a second shaft and that detects a torque applied to the first shaft and the second shaft based on a relative rotation displacement between the first shaft and the second shaft due to torsion of the coupling shaft, comprising:

a first rotation angle detection device that has the same configuration as a basic rotation angle detection device that is the rotation angle detection device according to claim 1 or that has the same configuration as that of the basic rotation angle detection device except a configuration of the multi-polar magnet, and that is used to detect a rotation angle of the first shaft; and a second rotation angle detection device that has the same configuration as that of the basic rotation angle detection device except the configuration of the multi-polar magnet, and that is used to detect a rotation angle of the second shaft, wherein a multi-polar magnet in the first rotation angle detection device is configured such that each magnetic pole pair of the multi-polar magnet in the basic rotation angle detection device is formed of at least one magnetic pole pair having the same magnetic force as that magnetic pole pair of the multi-polar magnet in the basic rotation angle detection device, a magnetic pole pair identifying unit in the first rotation angle detection device is configured to, among region numbers that indicate angular regions corresponding to the respective magnetic pole pairs of the multi-polar magnet in the basic rotation angle detection device, identify the region number corresponding to one of the angular regions, sensed by a reference magnetic sensor in the first rotation angle detection device, where a magnetic pole pair pattern in which an array of the plurality of magnetic pole pairs in the basic rotation angle detection device is expressed by an array of magnitudes of magnetic forces is set as a reference magnetic pole pair pattern, a multi-polar magnet in the second rotation angle computing device has such a magnetic pole pair pattern that the reference magnetic pole pair pattern is repeated n times (n is an integer larger than or equal to 2), a magnetic pole pair identifying unit in the second rotation angle detection device includes a first magnetic pole pair identifying unit and a second magnetic pole pair identifying unit, where a number that denotes the sequence of the magnetic pole pairs in each reference magnetic pole pair pattern included in the magnetic pole pair pattern of the multi-polar magnet of the second rotation angle detection device is defined as a relative magnetic pole pair number, the first magnetic pole pair identifying unit is configured to identify a relative magnetic pole pair number corresponding to the magnetic pole pair sensed by a reference magnetic sensor in the second rotation angle detection device, and the second magnetic pole pair identifying unit is configured to identify the magnetic pole pair sensed by the reference magnetic sensor in the second rotation angle detection device based on the relative magnetic pole pair number identified by the first magnetic pole pair identifying unit and the region number identified by the magnetic pole pair identifying unit in the first rotation angle computing device.

6. A torque detection device that includes a coupling shaft that couples a first shaft to a second shaft and that detects a torque applied to the first shaft and the second shaft based on a relative rotation displacement between the first shaft and the second shaft due to torsion of the coupling shaft, comprising:

a first rotation angle detection device that has the same configuration as a basic rotation angle detection device that is the rotation angle detection device according to claim 2 or that has the same configuration as that of the basic rotation angle detection device except a configuration of the multi-polar magnet, and that is used to detect a rotation angle of the first shaft; and a second rotation angle detection device that has the same configuration as that of the basic rotation angle detection device except the configuration of the multi-polar magnet, and that is used to detect a rotation angle of the second shaft, wherein a multi-polar magnet in the first rotation angle detection device is configured such that each magnetic pole pair of the multi-polar magnet in the basic rotation angle detection device is formed of at least one magnetic pole pair having the same magnetic force as that magnetic pole pair of the multi-polar magnet in the basic rotation angle detection device, a magnetic pole pair identifying unit in the first rotation angle detection device is configured to, among region numbers that indicate angular regions corresponding to the respective magnetic pole pairs of the multi-polar magnet in the basic rotation angle detection device, identify the region number corresponding to one of the angular regions, sensed by a reference magnetic sensor in the first rotation angle detection device, where a magnetic pole pair pattern in which an array of the plurality of magnetic pole pairs in the basic rotation angle detection device is expressed by an array of magnitudes of magnetic forces is set as a reference magnetic pole pair pattern, a multi-polar magnet in the second rotation angle computing device has such a magnetic pole pair pattern that the reference magnetic pole pair pattern is repeated n times (n is an integer larger than or equal to 2), a magnetic pole pair identifying unit in the second rotation angle detection device includes a first magnetic pole pair identifying unit and a second magnetic pole pair identifying unit, where a number that denotes the sequence of the magnetic pole pairs in each reference magnetic pole pair pattern included in the magnetic pole pair pattern of the multi-polar magnet of the second rotation angle detection device is defined as a relative magnetic pole pair number, the first magnetic pole pair identifying unit is configured to identify a relative magnetic pole pair number corresponding to the magnetic pole pair sensed by a reference magnetic sensor in the second rotation angle detection device, and the second magnetic pole pair identifying unit is configured to identify the magnetic pole pair sensed by the reference magnetic sensor in the second rotation angle detection device based on the relative magnetic pole pair number identified by the first magnetic pole pair identifying unit and the region number identified by the magnetic pole pair identifying unit in the first rotation angle computing device.

7. The torque detection device according claim 5 in a vehicle steering system, wherein
 the second rotation angle detection device is configured to detect the rotation angle of the second shaft as a steering angle.

8. The torque detection device according claim 6 in a vehicle steering system, wherein
 the second rotation angle detection device is configured to detect the rotation angle of the second shaft as a steering angle.

* * * * *